United States Patent [19]
Ishii et al.

[11] Patent Number: 5,620,610
[45] Date of Patent: Apr. 15, 1997

[54] CATALYST FOR TREATING WASTEWATER, PROCESS FOR PRODUCING IT, AND PROCESS FOR TREATING WASTEWATER WITH THE CATALYST

[75] Inventors: Tohru Ishii; Kiichiro Mitsui; Kunio Sano; Keniti Shishida; Yusuke Shiota, all of Hyogo, Japan

[73] Assignee: Nippon Shokubai Co., Ltd., Osaka, Japan

[21] Appl. No.: 154,361

[22] Filed: Nov. 18, 1993

Related U.S. Application Data

[63] Continuation-in-part of Ser. No. 878,978, May 6, 1992, Pat. No. 5,399,541.

[51] Int. Cl.$^6$ ........................................................ C02F 1/72
[52] U.S. Cl. ............................................ 210/763; 210/762
[58] Field of Search .................................... 210/763, 762

[56] References Cited

U.S. PATENT DOCUMENTS

| | | |
|---|---|---|
| 4,029,578 | 6/1977 | Turk . |
| 4,072,608 | 2/1978 | Farha, Jr. et al. . |
| 4,141,828 | 2/1979 | Okada et al. . |
| 4,278,614 | 7/1981 | Unemura et al. . |
| 4,294,706 | 10/1981 | Kakihara et al. . |
| 4,699,720 | 10/1987 | Harada et al. . |
| 4,751,005 | 6/1988 | Mitsui et al. . |
| 4,861,484 | 8/1989 | Lichtin et al. ............... 210/763 |
| 5,057,220 | 10/1991 | Harada et al. . |
| 5,145,587 | 9/1992 | Ishii et eal. . |
| 5,158,689 | 10/1992 | Ishii et al. . |
| 5,192,452 | 3/1993 | Mitsui et al. . |

FOREIGN PATENT DOCUMENTS

| | | |
|---|---|---|
| WO89/08079 | 9/1989 | Japan . |
| 3-224692 | 10/1991 | Japan . |

OTHER PUBLICATIONS

Derwent Publication, JP-A-48 095 388, dated Dec. 7, 1973.
Derwent Publication, JP-A-58 011 095, dated Jan. 21, 1983.
Dewent Publication, JP-A-2 187 130, dated Jul. 23, 1990.
Derwent Publication, JP-A-56 089 893, dated Jul. 21, 1981.
Derwent Publication, JP-A-51 134 386, dated Nov. 21, 1976.
Derwent Publication, JP-A-49 095 462, dated Sep. 10, 1974.
Derwent Publication, JP-A-51 144 060, dated Dec. 11, 1976.

*Primary Examiner*—Neil McCarthy
*Attorney, Agent, or Firm*—Armstrong, Westerman, Hattori, McLeland & Naughton

[57] ABSTRACT

The present invention provides a catalyst used in wastewater treatment process wherein not only an organic compound not containing nitrogen, sulfur or halogen is decomposed, but also a nitrogen-containing compound, a sulfur-containing compound and an organic halogeno compound are effectively decomposed, thereby wastewater are treated with excellent efficiency for a long period of time. The invention also provides a production process for the catalyst and said wastewater treatment process. The first catalyst comprises: an oxide of iron as an A component; and at least one kind of element as a B component selected from a group consisting of cobalt, nickel, cerium, silver, gold, platinum, palladium, rhodium, ruthenium and iridium. The second catalyst comprises: an oxide as an A component containing iron and at least one kind of element selected from a group consisting of titanium, silicon and zirconium; and at least one kind of element as a B component selected from a group consisting of cobalt, nickel, cerium, silver, gold, platinum, palladium, rhodium, ruthenium and iridium.

40 Claims, No Drawings

CATALYST FOR TREATING WASTEWATER, PROCESS FOR PRODUCING IT, AND PROCESS FOR TREATING WASTEWATER WITH THE CATALYST

This application is a continuation-in-part of application Ser. No. 07/878,978, filed May 6, 1992, now U.S. Pat. No. 5,399,541.

BACKGROUND OF THE INVENTION

The present invention relates to a catalyst which is used for wet oxidation treatment for wastewater containing organic compounds etc. and used for decomposing them and also, relates to a process for producing the catalyst and a process for treating wastewater with the wet oxidation under the presence of the catalyst.

There have been hitherto known methods for treating wastewater, such as a biochemical method called the activated-sludge method, a wet oxidation treatment called the Zimmerman method.

The activated-sludge method requires a long time to decompose organic compounds and also, requires to dilute wastewater up to a concentration suitable for the growth of algae and bacteria, so that it has a defect that a large scale of area is required to set treating facilities.

The Zimmerman method comprises treating wastewater in the presence of an oxygen gas under a high temperature and high pressure and decomposing organic compounds in the wastewater. In this method, there has been proposed a method which comprises a use of various kinds of oxidation catalysts in order to accelerate a reaction rate. The oxidation catalyst used here is a catalyst with a compound of a noble metal such as palladium, platinum or the like supported on a carrier such as alumina, silica, silica gel, active carbon or the like.

In general, it is rare that the chemical species included in wastewater to be treated is always the same. Thus, there are many cases where a nitrogen-containing compound is included besides a nitrogen-free organic compound.

However, wastewater including a nitrogen-containing compound such as an amine compound, an amide compound, an amino acid compound or the like is not treated with satisfactory efficiency by the above-mentioned methods.

Wastewater including an amine is usually treated by a cohesive treating method in which an anionic macromolecule cohesive agent is used. This method comprises gathering an amine by the anionic macromolecule cohesive agent and eliminating a formed precipitate (or sludge) from wastewater. Also, there has been attempted an adsorbent method which comprises bringing wastewater in contact with various kinds of adsorbents such as active carbon, activated clay, a silica gel, a complex oxide gel and the like, and adsorbing the amine to the adsorbent for eliminating it from the wastewater.

Since sludge formed by the cohesive treating method contains amines, it should not be abolished without a following treatment. Because of this, a treatment to decompose the amines in the sludge becomes necessary. In addition, the macromolecular cohesive agent is expensive, so a cost for the treatment becomes high.

Concerning the adsorbent method, the elimination percentage of amines is not satisfactory enough. Since the adsorbing power of an adsorbent easily decreases, there is a problem in durability of the adsorbent.

Since the wet oxidation process is unavoidable in the wastewater treatment, it will be convenient if an arrangement is made so as to decompose a nitrogen-containing compound included in the wastewater in the course of the wet oxidation process.

On the other hand, a treatment for wastewater including a sulfur-containing compound has been so far carried out by a respectively different method depending upon the state and nature of the sulfur-containing compound. For example, in a case of wastewater including an organic sulfur compound, a biological treatment is generally carried out. However, in a case where a compound containing thiophene and the like is treated, which affects badly upon organisms in sludge, a biological treatment can not be applied and, accordingly, a combustion treatment etc. are carried out.

Wastewater containing a sulfide such as sodium sulfide or the like: for example, wood digestion wastewater in paper- and pulp manufacture, wastewater coming out from a coke oven in steel manufacture, wastewater after fiber-washing, wastewater from a plant of petroleum chemical products such as ethylene, BTX and the like, as well as wastewater from a coal gasification plant, a petroleum-refining plant, a rayon factory and a dyeing plant; has been mostly treated by a method which comprises adding iron chloride into wastewater to solidify sulfur ions, removing solid iron sulfide by solid-liquid separation, adjusting pH of the separated solution, carrying out a biological treatment of the solution, and then discharging the treated wastewater. Also, wastewater containing a sulfite salt and thiosulfate salt: for example, wastewater coming out from a wood kiln of pulp-making factory, wastewater from photograph-developing, wastewater from metal treatment as well as alkaline wastewater used to absorb sulfur dioxide and the like; is treated by a method which comprises subjecting wastewater to neutralization-precipitation treatment followed by biological treatment and then discharging the treated wastewater.

When wastewater containing a sulfur-containing compound is treated by either one or both of biological treatment and combustion treatment, there exist the undermentioned problems to be solved. In the biological treatment, it is necessary to adjust a wastewater source solution by diluting it with water so that organisms are not badly affected. Therefore, wastewater to be treated becomes a large amount and facilities for the biological treatment must be arranged in a large scale, so that there is a serious problem is in the necessary cost and so forth.

Also, in the combustion treatment, when a heat amount generating from wastewater is low, a supplementary fuel must be added and also, because a large amount of sulfur is usually included in the wastewater, a large amount of sulfur oxides are formed and, therefore, it is necessary to arrange a desulfurizer.

Next, when wastewater including a sulfur-containing compound such as sulfide is treated, if a method which comprises removing the sulfur-containing compound as iron sulfide by adding iron chloride is applied, sludge having iron sulfide as a main component is formed and also, this method is complicate as a treating procedure, because it consists of the following steps: injection of solution of chemicals, solid and liquid separation, pH control and biological treatment.

The organic halogeno compounds have been used for various kinds of usage because of their stability. Since they are nonflammable and has great capability to degrease, they have been used in a large amount as a degreasing cleaner in metal, machinery and electronics industries as well as a cleaner for dry cleaning. On the other hand, the compounds have brought about problems on various fields. In general, since the organic halogeno compounds are difficult in decomposition, they are seriously accumulating in the natural environment and, as a result, ground water pollution has emerged everywhere. Furthermore, some of the organic halogeno compounds have been found to have carcinogenic nature against human bodies and, thus, trichloroethylene, tetrachloroethylene, 1,1,1-trichloroethane and the like have been designated as regulation items of the water-pollution preventive law on 1989, because of concern about influence on the human health.

Concerning treatment of the organic halogeno compounds, various methods have been proposed or used, and if the methods are roughly classified, there are a degradation method and a nondegradation method. Concerning the degradation method, there are listed a packed tower stripping method, a volatilizing method by means of exposing to air or heating, and an adsorption method using active carbon or macromolecules. Concerning the volatilizing method, the operation itself is very simple and at a low cost, but the method comprises only evaporating organic halogeno compounds in a liquid phase or a solution and scattering them in air and, therefore, basically it does not settle environmental pollution caused by organic halogeno compounds. Concerning the adsorption method, a secondary processing such as a recovering process after adsorption and a process to treat an adsorbent becomes necessary.

Concerning the degradation method, there are listed an irradiation method, a microorganism degradation method, a redox method and so forth. The irradiation method, of which representative examples are a photodecomposition method using a semiconductor as a catalyst and a radiation-irradiating method using a radiation, is still on an experimental stage and can not be adopted for a practical use. The microorganism degradation method takes a long time for treatment and its efficiency in treatment is unstable and, therefore, there exist many problems for a practical use. Concerning the redox method, a method of using an oxidizing agent such as ozone, hydrogen peroxide or the like and a method of reductive degradation method using iron have been attempted.

However, in a case where an organic halogeno compound exists in a high concentration, a method of highly efficient treatment has not yet been invented either as a nondegradation method or as a degradation method. In the volatilizing method, a large amount of organic halogeno compounds are discharged into air and, therefore, the method is not fundamental solution for the organic halogeno compounds to be treated. The adsorption method is short in the break-through time in a case of high concentration, so it is not practical. Concerning the degradation method, highly effective decomposition has not yet been a practical one, and also, there exists a problem that harmful decomposition products are secondarily generated. In short, a practical and fundamental method to remove the organic halogeno compounds is not yet developed at a present stage.

SUMMARY OF THE INVENTION

Accordingly, it is the first object of the present invention to provide a catalyst for treating wastewater which not only decomposes an organic compound not containing nitrogen, sulfur or halogen, but also decomposes effectively a nitrogen-containing compound, a sulfur-containing compound and an organic halogeno compound, whereby the wastewater treatment can be carried out with good efficiency for a long period of time. The second object of the present invention is to provide a process for producing an above type catalyst for treating wastewater with good efficiency. In addition, the third object of the present invention is to provide a process for treating wastewater with good efficiency for a long period of time, whether the wastewater includes a nitrogen-containing compound, a sulfur-containing compound or an organic halogeno compound or not.

To solve the first object, the present invention first provides a catalyst for treating wastewater, comprising: an oxide of iron as an A component; and at least one kind of element as a B component, which is selected from a group consisting of cobalt, nickel, cerium, silver, gold, platinum, palladium, rhodium, ruthenium and iridium. The present invention second provides a catalyst for treating wastewater, comprising: an oxide as an A component, which contains iron and at least one kind of element selected from a group consisting of titanium, silicon and zirconium; and at least one kind of element as a B component, which is selected from a group consisting of cobalt, nickel, cerium, silver, gold, platinum, palladium, rhodium, ruthenium and iridium.

To solve the second object, the present invention first provides a process for producing a catalyst for treating wastewater, comprising the following steps: obtaining a coprecipitate containing iron and at least one kind of element selected from a group consisting of cobalt, nickel, cerium, silver, gold, platinum, palladium, rhodium, ruthenium and iridium; and calcinating the coprecipitate. The present invention second provides a process for producing a catalyst for treating wastewater, comprising the following steps: obtaining an oxide of iron; and making this oxide contain at least one kind of element selected from a group consisting of cobalt, nickel, cerium, silver, gold, platinum, palladium, rhodium, ruthenium and iridium. The present invention third provides a process for producing a catalyst for treating wastewater, comprising the following steps: obtaining a coprecipitate containing iron and at least one kind of element selected from a group consisting of titanium, silicon and zirconium; calcinating the coprecipitate, in order to obtain an oxide containing iron and at least one kind of element selected from a group consisting of titanium, silicon and zirconium; and making this oxide contain at least one kind of element selected from a group consisting of cobalt, nickel, cerium, silver, gold, platinum, palladium, rhodium, ruthenium and iridium.

To solve the third object, the present invention first provides a process for treating wastewater, comprising wet oxidation treatment of the wastewater by using a solid catalyst under a condition that an oxygen gas is supplied at a pressure maintaining the wastewater in a liquid phase; being characterized in that a catalyst used as said solid catalyst contains the following two components: an oxide of iron as an A component; and at least one kind of element as a B component, which is selected from a group consisting of cobalt, nickel, cerium, silver, gold, platinum, palladium, rhodium, ruthenium and iridium. The present invention second provides a process for treating wastewater, comprising wet oxidation treatment of the wastewater by using a solid catalyst under a condition that an oxygen gas is supplied at a pressure maintaining the wastewater in a liquid phase; being characterized in that a catalyst used as said solid catalyst contains the following two components: an oxide as an A component, which includes iron and at least one kind of element selected from a group consisting of titanium, silicon and zirconium; and at least one kind of element as a B component, which is selected from a group consisting of cobalt, nickel, cerium, silver, gold, platinum, palladium, rhodium, ruthenium and iridium.

Wastewater to be treated in this invention includes a nitrogen-free organic compound, a nitrogen-containing compound, a sulfur-containing compound, an organic halogeno compound or the like. The nitrogen-free organic compounds are, for example, aldehydes; alcohols; lower organic acids such as acetic acid, formic acid and the like. The nitrogen-containing compounds are, for example, amine compounds, amide compounds, amino acid compounds and the like.

The amine compound, as far as it is a compound having an amino group in the molecule, may be any one of a primary amine, a secondary amine, a tertiary amine, and a quarternary amine salt. Practical examples are alkyl amines such as methylamine, dimethylamine, trimethylamine, propylamine and the like; alkylene diamines such as ethylenediamine, trimethylenediamine and the like; alkanol amines such as ethanolamine, triethanolamine and the like, all of which are aliphatic amines. In addition, the examples are aromatic amines such as aniline and the like; and nitrogen-containing heterocyclic compounds such as pyridine, picoline and the like.

The amide compound is a compound containing a group (RCONH—) made by combining an amino group with an acid group in its molecule. Practical examples are formamide, methylformamide, acetoamide, ethylformamide, methylpropionamide, dimethylformamide, diethylformamide, dimethylacetoamide, N-methylpyrroline and the like.

The amino acid compound is a compound containing a carboxyl group and an amino group in the same molecule and, it is called as an $\alpha$-amino acid, $\beta$-amino acid, $\gamma$-amino acid or the like. Practical examples are aliphatic amino acids such as glycine, alanine, valine, leucine, serine, cystine, aspartic acid, glutamic acid, lysine, alginine and the like; amino acids having an aromatic ring such as phenylalanine, tyrosine and the like; amino acids having a heterocyclic ring such as histidine, tryptophan, proline and the like; and others.

However, the nitrogen-containing compound, with which this invention deals, is not limited to the above-mentioned examples. The nitrogen-containing compound needs not to be under a condition of dissolving in water and, even if it is under a condition of floating and suspending and so forth, it can be decomposed by a treating process of this invention.

A nitrogen-containing compound in wastewater may exist in form of either a sole compound or a mixture of plural kinds. The nitrogen-containing compound in wastewater for which the present invention can be applied is not especially limited, but its concentration is usually in a range of from 10 to 100,000 mg/l.

The sulfur-containing compound in the present invention is an inorganic or organic compound containing at least one sulfur atom other than sulfuric acid ($SO_4^{2-}$). The compound includes, for example, a sulfide such as hydrogen sulfide, sodium sulfide, potassium sulfide, sodium hydrogen sulfide, sodium polysulfide and the like; thiosulfuric acids and their salts such as sodium thiosulfate, potassium thiosulfate and the like; sulfurous acids and their salts such as sodium sulfite and the like; trithionic acid, tetrathionic acid, and their salts such as sodium trithionate; thiols such as ethylmercaptan, thiophenol, 3,4-mercaptotoluene, dimercaptol, cystein and the like; thioacetals such as diethylthioacetal, 1-ethoxy-1-(methylthio)cyclopentane and the like; thiosulfites such as methyl thiosulfite, ethyl thiosulfite and the like; sulfides such as ethylsulfide, 1-(methylthio)propane, methionine and the like; thiins such as 4H-thiin and the like; thiocarbonates and their derivatives such as trithiocarbonate, sodium S-methyldithiocarbonate, diethyl trithiocarbonate, potassium O-ethyldithiocarbonate, S-methyl hydrogen thiocarbonate and the like; thio-acids and their derivatives such as sodium thiosulfate, hexanethio-acid, 1-piperidinecarbodithio-acid, hexanedithio-acid, O-thioacetic acid, S-thioacetic acid, dithiobenzoic acid, sodium dithioacetic acid, a S-ethyl ester of hexanethio-acid, an O-ethyl ester of hexanethio-acid, hexanethioyl chloride, 2-thiophenecarbothioamide, dibenzoic acid thioanhydride, di(thiobenzoic acid) anhydride and the like; thiocyans, thiocyanic acids and their salts such as rhodan, thiocyanic acid, potassium thiocyanic acid, ammonium thiocyanic acid and the like; thiocyanic acid esters such as methyl thiocyanate, ethyl thiocyanate, allyl thiocyanate and the like; thiosaccharides such as 1-thioglucose, S-methyl-5-thio-D-ribose and the like; thiazyl compounds such as fluorinated trithiazyl and the like; thiazines such as 1,2-thiazine, 1,3-thiazine, methylene blue and the like; thiazoles such as 1,3,4-thiadiazole, 1,3-thiazole, thioflavine, primuline and the like; thiocarbamides such as thiocarbamide, thiosemicarbamide, dithizone and the like; thiopyranes such as $\alpha$-thiopyran, $\gamma$-thiopyran, 3-methyl-4H-thiopyran and the like; thiophenes such as thiophene, methylthiophene, thionaphthene, thiophthene and the like; polysulfides such as diphenyltrisulfide, diphenyldisulfide, 1,4-bis(methyldithio)cyclohexane and the like; thioaldehydes such as hexanethial, cyclohex anecarbothioaldehyde and the like; thioketones such as cyclohexanethione, 1,3-dithiorane-2-thione, 2,4-pentanedithione and the like; sulfinyl compounds such as thionyl chloride, diethylsulfoxide and the like; sulfonium compounds such as trimethylsulfonium iodide and the like; sulfonyl compounds such as sulfuryl chloride, sulfonylamide, diethylsulfone, thiophene-1,1-dioxide and the like; sulfonic acids and their salts such as dodecylbenzenesulfonic acid, sodium p-toluenesulfonate, naphthalinesulfonic acid, sulfanilic acid, sulfobenzoic acid, methyl orange, benzenedithiosulfonic acid and the like; sulfonic acid derivatives such as ethyl methanesulfonate and the like; sulfinic acids and their derivatives such as 1-piperidinesulfinic acid and the like; sulfates such as dimethylsulfate, methyl hydrogen sulfate and the like; sulfamides and their derivatives such as phenylsulfamide and the like. These compounds may be soluble in an aqueous medium or exist as a suspending substance in an aqueous medium. Also, even if sulfuric acid is contained in wastewater, there is no problem for treating it.

The organic halogeno compound in this invention is an organic compound containing at least one or more of a halogen atom in its molecule. Preferable examples for this are an aliphatic organic chloro compound such as methyl chloride, ethyl chloride, dichloroethylene, trichloroethylene, tetrachloroethylene, 1,1,1-trichloroethane, vinyl chloride and the like; an aliphatic organic bromo compound such as methyl bromide, ethyl bromide, vinyl bromide and the like; an aromatic organic chloro compound such as monochlorobenzene, dichlorobenzene, benzyl chloride and the like; an aromatic organic bromo compound such as benzyl bromide, benzylidene bromide and the like; flon such as trichlorofluoromethane, dichlorofluoromethane and the like, but the example is not limited to the above-described compounds.

Hereinafter, the first catalyst for treating wastewater, which relates to the present invention, is explained in detail.

A feature of the first catalyst for treating wastewater of this invention is that, as an A component, an oxide of iron is used and, as a B component, at least one kind of element selected from a group consisting of cobalt, nickel, cerium, silver, gold, platinum, palladium, rhodium, ruthenium and iridium is used. A preferable form of this catalyst is such as a coprecipitate being calcinated, which is obtained from a solution containing elements of the catalyst A and B components, rather than a simple mixture of a powder oxide of the catalyst A component with a metal or compound of the catalyst B component. This calcinated product of the coprecipitate is not such as an oxide of the catalyst A component and a metal or compound of the catalyst B component being simply blended, but the product is a compound formed by that the catalyst A component and catalyst B component are well blended at a microscopic level and, accordingly, it is considered that novel properties not recognized in a metal or compound alone in each of the A and B components has emerged. Meanwhile, from a viewpoint that capability of decomposing the nitrogen-containing compounds, sulfur-containing compounds and organic halogeno compounds are superior, a preferable B component is a metal or compound containing at least one kind of element selected from a group consisting of platinum, palladium, rhodium, ruthenium and iridium.

Preferable proportions of each catalyst component in the first catalyst of this invention are, for the catalyst A component, in a range of from 0.05 to 99.95% by weight as an oxide, further preferably from 50 to 99.95% by weight as an oxide and, for the catalyst B component, in a range of from 0.05 to 99.95% by weight as a metal or compound, further preferably from 0.05 to 50% by weight. If the catalyst's A component or B component is out of the above range, catalytic activity may be insufficient. Or heat resistance and acid resistance may be inferior, which is unfavorable from a viewpoint of catalyst durability.

Although in this invention it is preferred to make the catalyst A and B components using a coprecipitation method, the A and B components may be prepared as complex oxides by another production process. A method to make the catalyst A and B components using the coprecipitation method is hereinafter explained by taking the $Fe_2O_3$-CoO compound as an example (as described above, an oxide which the $Fe_2O_3$-CoO makes in a closely blended form).

A precipitate is made by dissolving iron nitrate and cobalt nitrate in water followed by mixing them sufficiently and then, adding aqueous ammonia to form a precipitate, which is taken by filtration, washed, dried, and calcinated at a temperature in a range of from 300° to 900° C. This method is practically carried out, for example, as follows. The iron and cobalt source compounds (iron nitrate and cobalt nitrate) are taken in order to have a defined value in a weight ratio of $Fe_2O_3$ and CoO and, under a condition of an acidic aqueous solution, to have the concentration in a range of from 1 to 100 g per liter upon converting into the oxides of iron and cobalt ($Fe_2O_3$ and CoO), and a solution obtained as described above is maintained at a temperature in a range of from 10° to 100° C. With stirring, into this solution is added dropwise an aqueous ammonia as a neutralizing agent and, then, an obtained mixture is allowed to react for a time in a range of from 10 minutes to 3 hours at a pH in a range of from 2 to 10, whereby a coprecipitated compound (a precipitate) comprising iron and cobalt is formed. A thus-formed coprecipitate is taken by filration, well washed, dried at a temperature in a range of from 80° to 140° C. for a period of time in a range from 1 to 10 hours, and calcinated at a temperature in a range of from 300° to 900° C. for a period of time in a range from 1 to 10 hours, whereby a $Fe_2O_3$-CoO compound is obtained.

In this invention, to obtain a catalyst by the coprecipitation method, it is necessary to dissolve elements of the catalyst A and B components in water. To dissolve an element of the catalyst A component, that is iron, into water, a water-soluble iron compound may be dissolved into water. To dissolve an element of the catalyst B component into water, for example, a water-soluble compound or sol of the element may be dissolved into water.

A preferable water-soluble iron compound (an iron source) can be selected from, for example, inorganic iron compounds such as iron nitrate, iron sulfate, iron chloride and the like as well as organic iron compounds such as iron oxalate, iron citrate and the like.

A preferable starting material of the catalyst B component is an oxide, a hydroxide, an inorganic acid salt, an organic acid salt or the like and, for example, it is selected from an ammonium salt, oxalate, a nitrate, halogenide and the like.

Slight amounts of impurities and admixtures may be contained among these materials. However, as far as the impurities and admixture do not significantly affect properties of an obtained compound, such materials do not cause trouble.

There are dissolved in water an iron source and a water-soluble salt of at least one kind of element selected from a group consisting of cobalt, nickel, cerium, silver, gold, platinum, palladium, rhodium, ruthenium and iridium, and to this aqueous solution is added a basic compound such as aqueous ammonia, urea, sodium hydroxide, potassium hydroxide and the like to adjust the pH, whereby a precipitate is formed. The formed precipitate is a coprecipitate containing elements of the catalyst A and B components, which is usually a hydroxide. This precipitate is dried and then calcinated to convert it into an oxide. If required, the obtained oxide may be crushed and molded. This calcination is carried out, for example, in a temperature range of from 300° to 900° C. for a period of time in a range of from 1 to 10 hours, preferably, from 2 to 6 hours under an air stream.

Using a compound containing the catalyst A and B components (for example, a $Fe_2O_3$-CoO compound) prepared according to the forementioned process, a completed catalyst is obtained, for example, by the following procedure. One example of the procedure involves that a molding additive is added to a powder of the $Fe_2O_3$-CoO compound and an obtained mixture is well mixed with adding a proper amount of water, then kneaded, and molded by a molding device into a proper type such as a pellet, sphere, honeycomb type, etc.

The moldings is dried at a temperature in a range of from 50° to 120° C. and calcinated at a temperature in a range of from 300° to 1000° C., preferably from 350° to 900° C. for a period of time in a range from 1 to 10 hours, preferably form 2 to 6 hours, whereby a catalyst is obtained.

On the other hand, it is possible that to an oxide obtained from calcinating an iron-containing compound is added an aqueous solution of a metal salt of the forementioned B component together with a molding additive and, an obtained mixture is kneaded, molded, then dried and calcinated. The calcinating condition is, for example, similar to a case of calcinating the forementioned moldings.

Hereinafter, the second catalyst for treating wastewater, which relates to the present invention, is explained in detail.

The feature of the second catalyst for treating wastewater of this invention is using an oxide as an A component in the catalyst, which includes iron (hereinafter, referred to as "component (i)") and at least one kind of element (hereinafter, referred to as "component (ii)") selected from a group consisting of titanium, silicon and zirconium. The catalyst A component is, for example, a mixture of an oxide powder of the component (i) with an oxide powder of the component (ii). In a preferable case, a precipitate obtained from a solution containing an element in either one member of the components (i) and (ii) is well mixed with a salt slightly soluble in water containing an element in the other member of the components (i) and (ii) (which may be a precipitate obtained from a water-soluble salt containing an element in the other member or may be an oxide containing an element in the other member), and the obtained mixture is calcinated to convert into an oxide, which is then used as the catalyst A component. The calcinated product of the mixture is an oxide, which is derived from a form of the components (i) and (ii) mixed at a microscopic level more intimately than the each other's mixture of the forementioned oxide powders. A further preferable catalyst A component is an oxide obtained by calcinating a coprecipitate which is lead from a solution containing the components (i) and (ii).

This calcinated compound of the coprecipitate is not a simple mixture consisting of an oxide of the component (i) and an oxide of the component (ii), but it is a compound in which the components (i) and (ii) are well mixed at a microscopic level to form an oxide. It can be recognized that novel physical properties emerge, which are not observed in an oxide of each consisting component alone.

In the second catalyst of this invention, a preferable proportion of each component is 90 to 99.95% by weight for the catalyst A component and 0.05 to 10% by weight in form of a metal or a compound for the B component. If the B component is out of the above range, the oxidation activity may be insufficient. In addition, if the A component is out of the above range, the hot water resistance and acid resistance may be insufficient, so it is unfavorable in a viewpoint of catalysis durability. Furthermore, it is preferred that, in the catalyst A component, the component (i) is in a range of from 4.95 to 95% by weight as an oxide and the component (ii) is in a range of from 4.95 to 95% by weight as an oxide (here, a total of the components (i) and (ii) is in a range of from 90 to 99.95% by weight). If they deviate from these ranges, the hot water resistance and acid resistance may be insufficient and it is unfavorable in a point of catalyst durability.

In this invention, although it is preferable that the catalyst A component is prepared using coprecipitation method, the A component may be made as a complex oxide or the like by other production processes. A method of preparing the A catalyst component by a coprecipitation method is hereinafter explained by taking, as an example, a case where the A component is a $TiO_2$-$Fe_2O_3$ compound (this $TiO_2$-$Fe_2O_3$ compound is, as described above, an oxide that $TiO_2$ and $Fe_2O_3$ make in a closely blended form and, hereinafter, the same).

A precipitate is made by dissolving titanium sulfate (a titanium source compound) and iron nitrate (an iron source compound) in water and mixing them sufficiently, and by adding an aqueous ammonia. This precipitate is taken by filtration, washed, dried, and calcinated at a temperature in a range of from 300° to 750° C. To present a concrete example, this method is carried out as follows. That is, the above-described titanium source compound and iron source compound are taken so that a weight ratio of $TiO_2$ and $Fe_2O_3$ is in a specific value, and under a condition of an aqueous acidic solution, the titanium and iron are adjusted to a concentration of from 1 to 100 g per liter upon converting into oxides, and the aqueous acidic solution is maintained at a temperature in a range of from 10° to 100° C. Into this solution is added dropwise with stirring an aqueous ammonia as a neutralizing agent and, an obtained solution is stirred for a period of from further 10 minutes to 3 hours at a pH in a range of from 2 to 10, whereby a coprecipitated compound (a coprecipitate) consisting of titanium and iron is formed. The formed precipitate is taken by filtration, well washed, dried at a temperature in a range of of from 80° to 140° C. for a period of from 1 to 10 hours, and calcinated at a temperature in a range of from 300° to 750° C. for a period of from 1 to 10 hours, whereby a $TiO_2$-$Fe_2O_3$ compound is obtained.

In this invention, in order to obtain the catalyst A component by a coprecipitation method, it is necessary to dissolve elements of the components (i) and (ii) in water. To dissolve an element of the component (i) in water, for example, a water-soluble iron compound may be dissolved in water. To dissolve an element of the component (ii) in water, for example, a water-soluble compound or sol of the element may be dissolved in water.

A preferable water-soluble iron compound (an iron source) is selected from, for example, inorganic iron compounds such as iron nitrate, iron sulfate, iron chloride and the like; and organic iron compounds such as iron oxalate, iron citrate and the like.

A preferable water-soluble titanium compound or sol (a titanium source) is selected from, for example, inorganic titanium compounds such as titanium chlorides, titanium sulfate and the like; and organic titanium compounds such as titanium oxalate, tetraisopropyl titanate and the like.

A preferable water-soluble silicon compound or sol (a silicon source) is selected from, for example, inorganic silicon compounds such as colloid type silica, water glass, silicon tetrachloride and the like; and organic silicon compounds such as tetraethyl silicate and the like.

A preferable water-soluble zirconium compound or sol (a zirconium source) is selected from, for example, inorganic zirconium compounds such as zirconium oxychloride, zirconium nitrate, zirconium sulfate and the like; and organic zirconium compounds such as zirconium oxalate and the like.

In a group of these raw materials, although there exist such a member as containing slight amounts of impurities and mingling compounds, the impurities and mingled compounds in a raw material cause no problem as far as they do not affect on physical properties of an obtaining compound.

In the group of raw materials, at least one kind of source among the titanium, silicon and zirconium sources is dissolved with an iron source in water and, a precipitate is formed by varying pH with adding a base such as ammonia, urea, sodium hydroxide, potassium hydroxide or the like. The precipitate formed is a coprecipitate containing elements of the components (i) and (ii) and is usually a hydroxide. This precipitate is dried and calcinated to convert it into an oxide. If necessary, the oxide obtained may be crushed and molded. It is preferred that the calcinating is carried out at a temperature in a range of from 300° to 750° C. for a period of from 1 to 10 hours (more preferably for 2 to 6 hours ) with an air stream.

Using the A component (for example, a $TiO_2$-$Fe_2O_3$ compound) prepared by the forementioned process, a completed catalyst is obtained, for example, from the following process. A molding additive is added to a $TiO_2$-$Fe_2O_3$ compound powder and, an obtained mixture is further mixed with adding a proper amount of water, kneaded, and molded by a molding device to a proper shape such as a pellet, sphere, honeycomb type or the like.

A molded product is dried at a temperature in a range of from 50° to 120° C., and calcinated at a temperature in a range of from 300° to 750° C., preferably at a temperature in a range of from 350° to 700° C., for a period of from 1 to 10 hours, preferably for a period of from 2 to 6 hours with an air stream, whereby a carrier is obtained.

An obtained carrier is soaked in an aqueous solution of a respective metal salt of the catalyst B component to carry the metal salt, then dried and calcinated, whereby a catalyst for treating wastewater of this invention is obtained. Or an aqueous solution of a metal salt of the forementioned B component together with a molding additive may be added to the A component (for example, a $TiO_2$-$Fe_2O_3$, compound powder), and a mixture obtained above may be kneaded, molded, then dried and calcinated. The calcination condition is, for example, similar to a case of calcinating the forementioned moldings.

Or again, a metal salt of the B component may be added before or after coprecipitation of the A component.

A preferable starting material of the catalyst B component is an oxide, a hydroxide, an inorganic acid salt, an organic acid salt or the like of at least one kind of element selected from a group consisting of cobalt, nickel, cerium, silver, gold, platinum, palladium, rhodium, ruthenium and iridium. For example, it is selected from an ammonium salt, an oxalate, a nitrate, a sulfate, a halogenide or the like of said element.

An element of the B component is carried in a condition of a metal, a compound or the like.

The preferable solid catalyst, used in the process of present invention for treating wastewater, is a catalyst comprising the following components of $A_1$, $A_2$ and either one or both of $B_1$ and $B_2$, wherein:

the $A_1$ component consists of 30–99.95% by weight of an oxide of iron, preferably 45–99.95% by weight of an oxide of iron, more preferably 50–99.95% by weight of an oxide of iron, the $A_2$, component consists of 0–69.95% by weight of an oxide of at least one element selected from the group consisting of titanium, silicon and zirconium, the $B_1$ component consists of 0.05–50% by weight of metal or compound of at least one element selected from the group consisting of cobalt, nickel, cerium and silver, and the $B_2$ component consists of 0.05–10% by weight of a metal or compound of at least one element selected from the group consisting of gold, platinum, palladium, rhodium, ruthenium and iridium, wherein a total of the $A_1$, $A_2$, $B_1$ and $B_2$ is 100% by weight.

Among the aforementioned A components, the $A_1$ component needs to be used, but the $A_2$ component may be used as occasion demands. Among the aforementioned B components, both the $B_1$ and $B_2$ components may be jointly used, or either one of the $B_1$ and $B_2$ components may be used.

In a case where the aforementioned catalyst contains the $B_1$ component, the ratio by weight of $B_1$ to $A_1$, is preferably in a range of from 0.0005 to 0.4, and in a case where the aforementioned Sheet catalyst contains the $B_2$ component, the ratio by weight of $B_2$ to $A_1$ is preferably in a range of from 0.01 to 1.

If the amount of $A_1$, $A_2$ $B_1$, $B_2$ component deviates from the aforementioned range, or if the ratio by weight of $B_1$ to $A_1$ or the ratio by $B_2$ to $A_1$ deviates from the aforementioned range, the catalyst activity may become insufficient, or the hot water resistance or acid resistance of the catalyst may be inferior so that the life span of the catalyst may become short.

The catalyst, comprising the above components of $A_1$, $A_2$ and either one or both of $B_1$ and $B_2$ can be prepared either in a manner similar to the case of the first and second catalysts, or by the following procedure.

For example, one procedure comprises mixing well an aqueous solution of an element of the $A_2$ component, an iron salt slightly soluble in water, and an aqueous solution of either one or both of an element of the $B_1$ component and an element of the $B_2$ component to make a precipitate, and calcining the precipitate to obtain powder.

Another procedure comprises kneading well an iron salt slightly soluble in water, and an aqueous solution of either one or both of an element of the $B_1$ component and an element of the $B_2$ component, calcining the resulting kneaded product to obtain powder, kneading this powder together with a precipitate (gel) obtained from an aqueous solution of an element of the $A_2$ component; drying the kneaded powder and precipitate, and calcining the resulting kneaded product to obtain a catalyst as powder. The catalyst, obtained as the calcined powder, may be made into a calcined, molded product in a manner similar to the case of the first and second catalysts to use the calcined, molded product for wastewater treatment.

Concerning the shape of a catalyst of the present invention, although any one of a pellet, sphere, honeycomb, ring type and the like can be used, because blocking in a catalyst layer by a solid, a precipitate or the like may occur in a case of treating wastewater containing a suspension, the honeycomb type is especially preferred.

A preferable catalyst used in-this invention is such as having a specific composition as mentioned above. A preferable shape of the catalyst is one-body structure such as a pellet, particle and honeycomb type or other several types of structure. A catalyst of the particle type has an average diameter in a range of from 1 to 10 mm, preferably from 2 to 7 min. If the average diameter is less than 1 mm, pressure loss increases. If it is larger than 10 mm, the geometric surface area is not enough and sufficient treating capability can not be obtained, so that this is unfavorable. Relative surface area by the BET method is in a range of from 5 to 200 $m^2$ per gram, preferably, 10 to 80 $m^2$ per gram. If it is less than 5 $m^2$ per gram, contact efficiency between molecules to be treated and a catalyst lowers and, if it is larger than 200 $m^2$ per gram, the mechanical strength of a solid catalyst becomes weak, so that this is unfavorable. A catalyst of the pellet type has an average diameter in a range of from 1 to 10 mm, preferably from 3 to 8 mm and a length in a range of from 2 to 15 mm, preferably from 3 to 10 mm. If the average diameter is less than 1 mm or the length is shorter than 2 mm, pressure loss may increase and, if the average diameter is larger than 10 mm or the length is longer than 15 mm, the geometric surface area is not enough, the contact efficiency diminishes, and sufficient treating capability may not be obtained, so that this is unfavorable. It is preferred that relative surface area by the BET method of the pellet type catalyst is in a range similar to that in a case of the particle type. A preferable shape of a honeycomb type catalyst has a penetrating hole-corresponding diameter in a range of from 2 to 20 mm, a cell wall thickness in a range of from 0.1 to 3 mm, and an opening ratio in a range of from 50 to 90%. A further preferable shape has a penetrating hole-corresponding diameter in a range of from 2.5 to 15 mm, a cell wall thickness in a range of from 0.5 to 3 mm and an opening ratio in a range of from 50 to 90%. If the penetrating hole-corresponding diameter is less than 2 mm, pressure loss is large and, if it exceeds 20 mm, although the pressure loss becomes small, the contact percentage diminishes and the catalyst activity lowers. In a case where the cell wall thickness is less than 0.1 mm, although there is an advantage that the pressure loss is small and a catalyst can be converted into a light weight one, the mechanical strength of the catalyst may diminish. In a case where the cell wall thickness exceeds 3 mm, the mechanical strength is enough, but the pressure loss may become large. From the same reason to the above-described, a preferable opening ratio is in a range of from 50 to 90%.

To carry out a process for treating wastewater of this invention, for example, there is used a single cylindrical tube reactor for wet oxidation reaction or the like which is commonly used in a hitherto-known process for treating wastewater. A multiple tube reactor for wet oxidation reaction or the like is used depending upon wastewater to be treated.

In these reactors, for example, a catalyst for treating wastewater of this invention is arranged in a manner similar to a previous manner, and then wastewater is subjected to a wet oxidation process.

Next, one example of treatment condition for wastewater is explained.

First, in a case of wastewater including a nitrogen-containing compound, the temperature in the course of wastewater treatment is required to be set at a temperature lower than a critical temperature in order to maintain a liquid phase condition of the wastewater. A temperature lower than the critical one is properly selected, the atmosphere pressure is set at a pressure higher than a pressure under which the wastewater keeps its liquid phase at said temperature. A pressure of this sort is, for example, in a range of from 1 to 200 kgf/cm$^2$. According to this invention, the temperature necessary for treating wastewater can be set, for example, in a range of from 100° to 370° C., but it is possible to set it at a temperature which is about 50° C. lower compared with a case of previous wet oxidation treatment, and in this temperature range, decomposition of an organic compound or the like into carbon dioxide, water or the like as well as decomposition of nitrogen in a nitrogen-containing compound into a nitrogen gas are achieved.

Although existence of an oxygen gas is necessary for the reaction of wastewater treatment, air is preferable owing to its cheap cost, except a special case where apparatus-compacting or the like is wanted. A preferable amount of the oxygen gas is from 1 to 1.5 times of the theoretically required oxygen amount.

The pH of wastewater necessary for wet oxidation treatment may be set case by case between an acidic region and an alkaline region, and it is, for example, from 1 to 14.

Next, in a case of wastewater including a sulfur-containing compound, the wet oxidation process is carried out in the presence of the above-described catalyst at a temperature of 350° C. or lower under a pressure that the wastewater has a liquid phase, preferably, at a temperature lower than 180° C. under a pressure less than 101 kg/cm$^2$G and also, in the presence of an oxygen gas in an amount of 1 to 5 times of a theoretical oxygen amount which is required for oxidative decomposition of an inorganic compound containing a sulfur atom into an inorganic salt, a carbon dioxide gas, water, a nitrogen gas or the like. Besides, in a case where an organic compound contained in the wastewater is simultaneously converted into a harmless compound, a theoretical oxygen amount required for oxidative decomposition of the organic compound should be added. It is considered that the sulfur atom constituting an inorganic sulfur compound becomes harmless by being oxidized to a sulfate ion with the wet oxidation.

In the present invention, it is preferable to adjust the pH in a range of from a neutral to an alkaline region, after treatment of wastewater including a sulfur-containing compound is finished, by supplying an alkaline component before or during the treatment. This is because the oxidation reaction by a solid catalyst of the sulfur-containing compound is especially accelerated in a range of from a neutral to an alkaline region. Also, that is because, in a wet oxidation process under an acidic condition that sulfuric acid exists, the material of the wet oxidation reaction tube corrodes very much, so that it is afraid that the apparatus durability is damaged very much.

Finally, in a case of wastewater including an organic halogeno compound, the wet oxidation reaction in this invention is carried out in the presence of a specific catalyst, by keeping the wastewater at a temperature in a range of from 100° to 370° C., under a pressure which maintains the wastewater in a liquid phase, and in the presence of an oxygen gas in an amount equal to or more than the theoretically required amount to oxidize the organic halogeno compounds being contained in wastewater into carbon dioxide, water, water-soluble salts, ashes and others. In a case where oxygen-consuming substances (hereinafter, referred to as "TOD components") such as other organic compounds etc. exists, that is a pollution factor of the wastewater, a theoretical amount of oxygen required for oxidative degradation of the TOD component should be added. In a case where the organic halogeno compounds are treated by the present invention, the halogen atom in the wastewater becomes harmless by being converted into a halide ion. That is, the chlorine atom in an organic chloro compound, the fluorine atom in an organic fluoro compound, and the bromine atom in an organic bromo compound are converted into the Cl$^-$ ion, F$^-$ ion, and Br$^-$ ion, respectively, so that said halogen atoms become harmless.

In this invention, it is preferred to make salts by adding beforehand into wastewater an equivalent amount or more of cations which make pairs with halide ions generating from the wet oxidation. In adding cations, it is further preferred that alkali metal ions such as sodium, potassium or other ions are added. By adding the alkali metal ions into wastewater, durability decrease of a reaction tube caused by that wastewater becomes acidic in the course of treatment is prevented, and in addition, the reaction rate is accelerated, so that faster treatment becomes possible. As far as the alkali metal ions show an alkaline character by dissolving them into wastewater, any kind of the ions can be used and, for example, there are listed for use sodium hydroxide, potassium hydroxide, sodium carbonate, sodium acetate and the like. In a case where a salt containing an organic acid moiety such as sodium acetate or the like is added into wastewater, the acetate ion is decomposed up to carbon dioxide and water, similarly to the case of organic halogeno compounds.

Concerning the oxygen-containing gas in this invention, a gas having any oxygen concentration may be used. As the oxygen concentration in an oxygen-containing gas becomes higher, the reaction rate is more accelerated and faster treatment becomes possible. However, since sufficient efficiency on treatment is obtainable even by the air, the oxygen concentration of an oxygen-containing gas may be properly determined depending upon factors such as cost and the like.

The first catalyst for treating wastewater of this invention contains, as an A component, an oxide of iron and, as a B component, at least one kind of element selected from a group consisting of cobalt, nickel, cerium, silver, gold, platinum, palladium, rhodium, ruthenium and iridium. This catalyst maintains its catalytic activity for a long period of time even if wastewater includes a nitrogen-containing compound, a sulfur-containing compound or an organic halogeno compound when the wastewater being treated with wet oxidation.

In the second catalyst for treating wastewater relating to this invention, the B component is at least one kind of element selected from a group consisting of cobalt, nickel, cerium, silver, gold, platinum, palladium, rhodium, ruthenium and iridium. The A component is an oxide containing iron and at least one kind of element selected from a group consisting of titanium, silicon and zirconium. This catalyst maintains its catalytic activity for a long period of time even if wastewater includes a nitrogen-containing compound, a sulfur-containing compound or an organic halogeno compound when the wastewater being treated with wet oxidation.

Wastewater can be treated with excellent efficiency for a long period of time, even if the wastewater includes a nitrogen-containing compound, a sulfur-containing compound or an organic halogeno compound, by subjecting the wastewater to wet oxidation treatment using such a catalyst as stated above, similar to a case where the wastewater does not include said compounds. In addition, since nitrogen in the nitrogen-containing compound is decomposed up to a nitrogen gas, post-treatment as carried out in previously-known conventional methods becomes unnecessary.

A catalyst for treating wastewater of this invention not only decomposes a nitrogen-free organic compound, but also decomposes nitrogen in a nitrogen-containing compound up to a nitrogen gas. By using this catalyst, whether wastewater includes a nitrogen-containing compound or not, the wastewater treatment can be carried out for a long period of time with excellent efficiency.

According to a catalyst for treating wastewater of this invention, a compound containing sulfur and other pollution substances in wastewater can be decomposed by oxidation with excellent efficiency and, it is possible to convert them into inorganic salts, carbon dioxide, water, ash or the like. Then, biological treatment is not required as a post-treatment at all and treated wastewater may be directly discharged, or even if the biological treatment is required as a post-treatment, a substance which may affect badly on an organism has already been decomposed, and it is unnecessary to regulate wastewater on which the wet oxidation process has been carried out, except for a pH adjustment. Therefore, an amount of the treated wastewater becomes small and biological treatment facilities are not necessary at all or they can be very small compared with previous facilities, and treatment process is simplified. Consequently, an advantage comes on the investment and running cost of facilities.

According to this invention, it is possible to convert an organic halogeno compound, which is included in wastewater, into carbon dioxide, water, soluble salts, ash or the like with excellent efficiency and whereby to make the compound harmless without secondary forming of harmful substances.

According to a process for producing a catalyst for treating wastewater of this invention, a superior catalyst for treating wastewater as described above can be produced with excellent efficiency.

According to a process for treating wastewater of this invention, whether the wastewater includes a nitrogen-containing compound, a sulfur-containing compound or an organic halogeno compound or not, it is possible to treat wastewater for a long period of time with excellent efficiency.

DESCRIPTION OF THE PREFERRED EMBODIMENTS

Hereinafter, catalyst preparation examples and wastewater treatment examples relating to practical examples of the present invention and comparative catalyst preparation examples and comparative wastewater treatment examples are shown, but the present invention is not limited to the below-described examples.

Preparation Example 1

A compound consisting of iron and ruthenium was prepared by the undermentioned process.

Into 50 liter of water were dissolved 4.81 kg of ferric nitrate [$Fe(NO_3)_3 \cdot 9H_2O$] and an obtained solution was well mixed with adding 500 cc of an aqueous ruthenium nitrate solution (100 g/l as Ru). To this mixture maintained at about 30° C. with well stirring, an aqueous ammonia was gradually added dropwise until pH 8 being indicated, and an obtained mixture was still stood for 15 hours to make a precipitate (gel).

This gel was taken by filtration, washed with water, and dried at 120° C. for 10 hours. Then, it was calcinated at 700° C. for 5 hours under an air atmosphere. According to a X-ray diffraction analysis, the obtained powder consisted of $Fe_2O_3$ and Ru, in which the weight ratio between $Fe_2O_3$ and Ru was 95 versus 5 according to a fluorescence X-ray analysis.

Using this obtained powder, a catalyst was prepared by the undermentioned process.

Water, the obtained powder and starch were mixed and well kneaded by a kneader. This kneaded product was molded by a molding device to pellets of paticle diameter 5 mm $\phi$ and length 6 mm, dried at 120° C. for 6 hours and then, calcinated at 500° C. for 3 hours.

Preparation Example 2

Into 50 liter of water were dissolved 3.54 kg of ferric nitrate [$Fe(NO_3)_3 \cdot 9H_2O$], 1.09 kg of cobalt nitrate and 200 cc of an aqueous platinum nitrate solution (100 g/l as Pt), and an obtained solution was well mixed. To this mixture maintained at about 30° C. with well stirring, an aqueous ammonia was gradually added dropwise until pH 8 being indicated, and an obtained mixture was still stood for 15 hours to make a precipitate (gel).

This gel was taken by filtration, washed with water, and dried at 120° C. for 10 hours. Then, it was calcinated at 700° C. for 5 hours under an air atmosphere. According to a X-ray diffraction analysis, the obtained powder consisted of $Fe_2O_3$, CoO and Pt, in which the weight ratio among $Fe_2O_3$, CoO and Pt was 70:28:2 according to a fluorescence X-ray analysis.

Using this obtained powder, a catalyst was prepared by the undermentioned process.

Water, the obtained powder and starch were mixed and well kneaded by a kneader. This kneaded product was molded by a molding device to pellets of paticle diameter 5 mm $\phi$ and length 6 mm, dried at 120° C. for 6 hours and then, calcinated at 500° C. for 3 hours.

Preparation Example 3

Into 50 liter of water were dissolved 2.53 kg of ferric nitrate [$Fe(NO_3)_3 \cdot 9H_2O$], 1.21 kg of cerous nitrate [$Ce(NO_3)_3 \cdot 6H_2O$] and 200 cc of an aqueous palladium nitrate solution (100 g/l as Pd), and an obtained solution was well mixed. To this mixture maintained at about 30° C. with well stirring, an aqueous ammonia was gradually added dropwise until pH 8 being indicated, and an obtained mixture was still stood for 15 hours to make a precipitate (gel).

This gel was taken by filtration, washed with water, and dried at 120° C. for 10 hours. Then, it was calcinated at 700° C. for 5 hours under an air atmosphere. According to a X-ray diffraction analysis, the obtained powder consisted of $Fe_2O_3$, $CeO_2$ and Pd, in which the weight ratio among $Fe_2O_3$, $CeO_2$ and Pd was 50:48:2 according to a fluorescence X-ray analysis.

Using this obtained powder, a catalyst was prepared by the undermentioned process.

Water, the obtained powder and starch were mixed and well kneaded by a kneader. This kneaded product was molded by a molding device to pellets of paticle diameter 5 mm φ and length 6 mm, dried at 120° C. for 6 hours and then, calcinated at 500° C. for 3 hours.

Treatment Examples 1 to 3

Using each of the catalysts obtained from the preparation examples 1 to 3, wastewater treatment was carried out by wet oxidation according to the following procedure.

Each of the catalysts (1000 cc) was filled in a reaction tube made of a stainless steel of a wet oxidation column and, from a down part of the reaction tube, preheated wastewater blended with air containing oxygen in a concentration of about 21% was continuously introduced for 5,000 hours, the COD (Cr) concentration and total nitrogen amount were measured at an entrance and exit of the reaction tube to calculate their elimination percentages. Meanwhile, wastewater to be treated contained 15,000 mg/l of dimethylformamide and showed 20,000 mg/l in the COD (Cr) concentration.

The reaction conditions were 200° C. at a reaction temperature, 40 kg/cm² G at a reaction pressure, 2 liter per hour at the rate of supplying wastewater, and 230N liter per hour at the rate of supplying air. Obtained results are shown in Table 1.

TABLE 1

| | kind of catalyst | elimination percentage of COD (Cr) (%) | elimination percentage of total nitrogen amount (%) |
|---|---|---|---|
| treatment example 1 | preparation example 1 | 99.0 | 99.5 |
| treatmnt example 2 | preparation example 2 | 99.5 | 99.1 |
| treatment example 3 | preparation example 3 | 99.5 | 99.0 |

As seen in Table 1, in a continuous operation for 5,000 hours under the forementioned conditions, decrease in the elimination percentages of the COD (Cr) and total nitrogen amount was not recognized.

Treatment Examples 4 to 6

According to the treatment example 1, wastewater treatment was carried out by wet oxidation using each of the catalysts obtained from the preparation examples 1 to 3.

Wastewater to be treated contained 20,000 mg/l of glycine and showed 19,000 mg/l in the COD (Cr) concentration.

The reaction conditions were 200° C. at a reaction temperature, 40 kg/cm² G at a reaction pressure, 2 liter per hour at the rate of supplying wastewater, and 160N liter per hour at the rate of supplying air. Obtained results are shown in Table 2.

TABLE 2

| | kind of catalyst | elimination percentage of COD (Cr) (%) | elimination percentage of total nitrogen amount (%) |
|---|---|---|---|
| treatment example 4 | preparation example 1 | 98.5 | 99.0 |
| treatment example 5 | preparation example 2 | 99.0 | 99.0 |
| treatment example 6 | preparation example 3 | 98.9 | 98.7 |

As seen in Table 2, in a continuous operation for 3,000 hours under the forementioned conditions, decrease in the elimination percentages of the COD (Cr) and total nitrogen amount was not recognized.

Treatment Examples 7 to 9

According to the treatment example 1, wastewater treatment was carried out by wet oxidation using each of the catalysts obtained from the preparation examples 1 to 3. Wastewater to be treated contained 10,000 mg/l of ethanolamine and showed 12,000 mg/l in the COD (Cr) concentration.

The reaction conditions were 200° C. at a reaction temperature, 40 kg/cm² G at a reaction pressure, 2 liter per hour at the rate of supplying wastewater, and 140N liter per hour at the rate of supplying air. Obtained results are shown in Table 3.

TABLE 3

| | kind of catalyst | elimination percentage of COD (Cr) (%) | elimination percentage of total nitrogen amount (%) |
|---|---|---|---|
| treatment example 7 | preparation example 1 | 98.8 | 99.0 |
| treatment example 8 | preparation example 2 | 98.5 | 98.5 |
| treatment example 9 | preparation example 3 | 98.5 | 98.5 |

As seen in Table 3, in a continuous operation for 3,000 hours under the forementioned conditions, decrease in the elimination percentages of the COD (Cr) and total .nitrogen amount was not recognized.

Preparation Example 4

Into 50 liter of water were dissolved 10 kg of ferric nitrate [$Fe(NO_3)_3 \cdot 9H_2O$]. To an obtained solution maintained at about 30° C. with well stirring, an aqueous ammonia was gradually added dropwise until pH 8 being indicated, and an obtained mixture was still stood for 16 hours to make a precipitate (gel).

This gel was taken by filtration, washed with water, and dried at 120° C. for 16 hours. Then, it was calcinated at 700° C. for 6 hours under an air atmosphere. According to a X-ray diffraction analysis, an obtained powder consisted of $Fe_2O_3$.

Using this obtained powder, a catalyst was prepared by the undermentioned process.

Water, the obtained powder and starch were mixed and well kneaded by a kneader. This kneaded product was molded by a molding device to pellets having a particle diameter 5 mm φ and length 6 mm, and calcinated at 500° C. for 4 hours under an air atmosphere.

The pellets thus-obtained were soaked in an aqueous ruthenium nitrate solution, dried at 120° C. for 6 hours, and calcinated at 400° C. for 4 hours.

An obtained, completed catalyst showed composition having a 99.3 versus 0.7 ratio by weight between $Fe_2O_3$ and ruthenium, according to a fluorescence X-ray analysis.

Treatment Example 10

Using the catalyst obtained from preparation example 4, wastewater having the below-mentioned composition was continuously treated for 1000 hours under the reaction conditions of 130° C. at a reaction temperature, 9 kg/cm$^2$ G at a reaction pressure, 1 liter per hour at the rate of supplying wastewater, and 667N liter per hour at the rate of supplying air [ratio of $O_2$/TOD (amount of oxygen in air/theoretical oxygen demand) is 2].

| | |
|---|---|
| pH | 13 |
| $Na_2S$ | 8% |
| NaSH | 3% |
| $Na_2CO_3$ | 3% |
| TOD | 100,000 mg/l |

Such a treatment resulted in that COD (Cr) was 3500 mg/l or less, sulfide ion was 0.1 mg/l or less, and thiosulfate ion was 5000 mg/l or less.

Comparative Preparation Example 1

Into 100 liter of water were gradually dissolved 7 kg of titanium tetrachloride ($TiCl_4$). To an obtained solution maintained at about 30° C. with well stirring, an aqueous ammonia was gradually added dropwise until pH 8 being indicated, and an obtained mixture was still stood for 16 hours to make a precipitate (gel).

This gel was taken by filtration, washed with water, and dried at 120° C. for 16 hours. Then, it was calcinated at 600° C. for 5 hours under an air atmosphere. According to a X-ray diffraction analysis, an obtained powder consisted of $TiO_2$.

Using this obtained powder, a catalyst was prepared by the undermentioned process.

Water, the obtained powder and starch were mixed and well kneaded by a kneader. This kneaded product was molded by a molding device to a spherical shape of an average particle diameter 6 mm, and calcinated at 500° C. for 4 hours under an air atmosphere.

A thus-obtained, spherically molded product was soaked in an aqueous iridium chloride solution, dried at 140° C. for 3 hours, and calcinated at 450° C. for 4 hours.

An obtained, completed catalyst showed composition having a 99.8 versus 0.2 ratio by weight between $TiO_2$ and Ir, according to a fluorescence X-ray analysis.

Comparative Treatment Example 1

The catalyst of comparative preparation example 1 obtained by the above-mentioned process was filled in a reaction tube. Treatment of wastewater similar to the wastewater used in treatment example 10 was carried out according to treatment example 10 under the conditions similar to treatment example 10. As a result, COD (Cr) was 11,000 mg/l or less, sulfide ion was 50 mg/l or less, and thiosulfate ion was 14,000 mg/l or less.

Preparation Example 5

The pellet-like molded product of the oxide of iron obtained from preparation example 4 was soaked in an aqueous chloroplatinic acid solution, dried at 150° C. for 4 hours, and calcinated at 450° C. for 3 hours.

An obtained, completed catalyst showed composition having a 99.7 versus 0.3 ratio by weight between the oxide of iron and platinum, according to a fluorescence X-ray analysis.

Treatment Example 11

The catalyst, 500 cc, obtained from preparation example 5 was filled in a reaction tube. Treatment of wastewater having the below-mentioned composition was carried out according to treatment example 10 under the conditions of 200° C. at a reaction temperature, 50 kg/cm$^2$ G at a reaction pressure, 1 liter per hour at the rate of supplying wastewater, and 220N liter per hour at the rate of supplying air [ratio of $O_2$/TOD (amount of oxygen in air/theoretical oxygen demand) is 1.2]. In addition, other conditions were as follows.

| | |
|---|---|
| Thiophene: | 0.1% |
| Sodium rhodanide: | 3.0% |
| Dimethyl sulfoxide: | 1.5% |
| TOD: | 55 g/l |

The above-mentioned treament resulted in that treated wastewater containing 40 mg/l or less of thiophene, 10 mg/l or less of sodium rhodanide and 20 mg/l or less of dimethyl sulfoxide was stably obtained. In addition, TOC treatment efficiency was 83%.

Comparative Preparation Example 2

γ-alumina (spherical; average particle diameter 5 mm) was soaked in an aqueous palladium nitrate solution, dried at 120° C. for 5 hours, and calcinated at 400° C. for 4 hours.

An obtained, completed catalyst showed composition having a 99.5 versus 0.5 ratio by weight between the alumina and palladium, according to a fluorescence X-ray analysis.

Comparative Treatment Example 2

The catalyst, 500 cc, obtained from comparative preparation example 2 was filled in a reaction tube. Treatment of wastewater similar to the wastewater used in treatment example 11 was carried out, according to treatment example 11, under the conditions similar to treatment example 11.

The above-mentioned treament resulted in that treated wastewater containing 100 mg/l or less of thiophene, 1200 mg/l or less of sodium rhodanide and 900 mg/l or less of dimethyl sulfoxide was stably obtained. In addition, TOC treatment efficiency was 61%.

Preparation Examples 6 to 11

The pellet type molded product of the oxide of iron obtained from preparation example 4 was soaked in an aqueous solution of one kind among ruthenium nitrate, chloroauric acid, palladium nitrate, iridium chloride, silver nitrate and rhodium nitrate. Then, the soaked product was dried at 120° C. for 5 hours and calcinated at 400° C. for 4 hours.

Treatment Examples 12 to 17

Each of the catalysts, 500 cc, obtained from preparation examples 6 to 11 was filled in a reaction tube. Treatment of wastewater similar to the wastewater used in treatment example 11 was carried out under the conditions similar to treatment example 11.

Results obtained were shown in Table 4.

TABLE 4

| | kind of catalyst | kind of metal soaked-in (B component) | amount of B component in catalyst (wt %) | treatment efficiency of TOC (%) |
|---|---|---|---|---|
| treatment example 12 | preparation example 6 | Ru | 0.5 | 80 |
| treatment example 13 | preparation example 7 | Au | 0.5 | 76 |
| treatment example 14 | preparation example 8 | Pd | 0.5 | 81 |
| treatment example 15 | preparation example 9 | Ir | 0.3 | 82 |
| treatment example 16 | preparation example 10 | Ag | 3.0 | 77 |
| treatment example 17 | preparation example 11 | Rh | 0.2 | 82 |

Preparation Examples 12 to 14

Similarly to preparation example 1, into 100 liter of water were dissolved ferric nitrate and other metal nitrates. To this solution, sodium hydroxide was added until pH 8.5 being indicated to form a precipitate. Then, oxides of iron and added metals were obtained by carrying out the procedure similar to preparation example 1.

These oxides were molded by the procedure similar to preparation example 1. Whereby, pellet type molded products (catalysts) of paticle diameter 5 mm φ and length 6 mm were obtained.

Treatment Examples 18 to 20

Each of the catalysts, 500 cc, obtained from preparation examples 12 to 14 was filled in a reaction tube. Treatment of wastewater similar to the wastewater used in treatment example 10 was carried out under the conditions similar to treatment example 10.

Results obtained were shown in Table 5.

TABLE 5

| | kind of catalyst | kind of metal in added-metal solution | amount of oxide of left-described metal in catalyst (wt %) | COD (Cr) concentration in treated water (mg/l) |
|---|---|---|---|---|
| treatment example 18 | preparation example 12 | Co | 31.9 | 6,500 |
| treatment example 19 | preparation example 13 | Ni | 23.8 | 8,200 |
| treatment example 20 | preparation example 14 | Ce | 21.2 | 6,200 |

Preparation Example 15

Into 100 liter of water were dissolved 24.87 kg of ferrous sulfate [$FeSO_4 \cdot 7H_2O$] and 2.00 kg of cerous nitrate [$Ce(NO_3)_3 \cdot 6H_2O$]. An obtained solution was well mixed. To this mixture maintained at about 30° C. with well stirring, an aqueous ammonia was gradually added dropwise until pH 9 being indicated, and an obtained mixture was still stood for 24 hours to make a precipitate (gel).

This gel was taken by filtration, washed with water, and dried at 120° C. for 16 hours. Then, it was calcinated at 600° C. for 5 hours under an air atmosphere. According to a X-ray diffraction analysis, the obtained powder consisted of $Fe_2O_3$ and $CeO_2$, in which the weight ratio between $Fe_2O_3$ and $CeO_2$ was 9 versus 1 according to a fluorescence X-ray analysis.

Using this obtained powder, a catalyst was prepared by the undermentioned process.

Water, the obtained powder and starch were mixed and well kneaded by a kneader. This kneaded product was molded by a molding device to a spherical shape of average paticle diameter 6 mm and calcinated at 500° C. for 4 hours under an air atmosphere.

Treatment Example 21

The catalyst, 500 cc, obtained from preparation example 15 was filled in a reaction tube. Treatment of wastewater similar to the wastewater used in treatment example 11 was carried out under the conditions similar to treatment example 11.

The above-mentioned treament resulted in that treated wastewater containing 100 mg/l or less of thiophene, 10 mg/l or less of sodium rhodanide and 200 mg/l or less of dimethyl sulfoxide was stably obtained. In addition, TOC treatment efficiency was 69%.

Preparation Example 16

The spherical molded product of the iron-cerium oxide obtained from preparation example 15 was soaked in an aqueous ruthenium solution. Then, this soaked product was dried at 130° C. for 3 hours and calcinated at 400° C. for 4 hours.

An obtained, completed catalyst showed composition having a 99.3 versus 0.7 ratio by weight between the iron-cerium oxide and ruthenium, according to a fluorescence X-ray analysis.

Treatment Example 22

The catalyst, 500 cc, obtained from preparation example 16 was filled in a reaction tube. Treatment of wastewater similar to the wastewater used in treatment example 11 was carried out under the conditions similar to treatment example 11.

The above-mentioned treament resulted in that treated wastewater containing 30 mg/l or less of thiophene, 10 mg/l or less of sodium rhodanide and 10 mg/l or less of dimethyl sulfoxide was stably obtained. In addition, TOC treatment efficiency was 84%.

Comparative Preparation Examples 3 to 8

Similarly to preparation examples 6 to 11, the pellet-like molded product of the oxide of titanium obtained from comparative preparation example 1 was soaked in each of the aqueous metal salt solutions and calcinated. Whereby, catalyst were obtained.

Comparative Treatment Examples 3 to 8

Each of the catalysts obtained from comparative preparation examples 3 to 8 was filled in a reaction tube. Treatment of wastewater similar to the wastewater used in treatment example 10 was carried out under the conditions similar to treatment example 10.

Results obtained were shown in Table 6.

TABLE 6

| kind of catalyst | kind of metal soaked-in | amount of left-described metal component in catalyst (wt %) | COD (Cr) concentration in treated water (mg/l) |
| --- | --- | --- | --- |
| comparative treatment example 3 | comparative preparation example 3 | Ru | 0.5 | 14,000 |
| comparative treatment example 4 | comparative preparation example 4 | Au | 0.5 | 18,000 |
| comparative treatment example 5 | comparative preparation example 5 | Pd | 0.5 | 12,000 |
| comparative treatment example 6 | comparative preparation example 6 | Ir | 0.3 | 11,000 |
| comparative treatment example 7 | comparative preparation example 7 | Ag | 3.0 | 19,000 |
| comparative treatment example 8 | comparative preparation example 8 | Rh | 0.2 | 12,000 |

Comparative Preparation Examples 9 to 11

Similarly to preparation example 1, into 100 liter of water were added a titanyl salfate solution and a metal nitrate. To this solution, sodium hydroxide was added until pH 8.5 being indicated to form a precipitate. Then, an oxide of the titanium and added metal was obtained by carrying out the procedure similar to preparation example 1.

This oxide was molded by the procedure similar to preparation example 1. Whereby, a pellet-like molded product (catalysts) of particle diameter 5 mm φ and length 6 mm was obtained.

Comparative Treatment Examples 9 to 11

Each of the catalysts, 500 cc, obtained from comparative preparation examples 9 to 11 was filled in a reaction tube. Treatment of wastewater similar to the wastewater used in treatment example 11 was carried out under the conditions similar to treatment example 11.

Results obtained were shown in Table 7.

TABLE 7

| kind of catalyst | kind of metal in added-metal solution | amount of oxide of left-described metal in catalyst (wt %) | treatment efficiency of TOC (%) |
| --- | --- | --- | --- |
| comparative treatment example 9 | comparative preparation example 9 | Co | 31.9 | 46 |
| comparative treatment example 10 | comparative preparation example 10 | Ni | 23.8 | 47 |
| comparative treatment example 11 | comparative preparation example 11 | Ce | 21.2 | 58 |

Preparation Examples 17 to 19

Into 50 liter of water were dissolved 10 kg of ferric nitrate [$Fe(NO_3)_3 \cdot 9H_2O$]. To this solution maintained at about 30° C. with well stirring, an aqueous ammonia was gradually added dropwise until pH 8.5 being indicated, and an obtained mixture was still stood for 16 hours to make a precipitate (gel).

This gel was taken by filtration, washed with water, and dried at 120° C. for 16 hours. Then, it was calcinated at 600° C. for 8 hours under an air atmosphere. According to a X-ray diffraction analysis, an obtained powder consisted of $Fe_2O_3$.

Using this obtained powder, a catalyst was prepared by the undermentioned process.

Water, the obtained powder and starch were mixed and well kneaded by a kneader. This kneaded product was molded by a molding device to pellets having a particle diameter 5 mm φ and length 6 mm, and calcinated at 500° C. for 4 hours under an air atmosphere.

The pellets thus-obtained were soaked in an aqueous solution of iridium nitrate, platinum nitrate or ruthenium nitrate. These soaked products were dried at 120° C. for 6 hours and then calcinated at 400° C. for 4 hours.

Treatment Examples 23 to 25

Using each of the catalysts obtained from the preparation examples 17 to 19, treatment of wastewater containing 500 mg/l of trichloroethylene was carried out by wet oxidation according to the following procedure.

Each of the catalysts (500 cc) was filled in a reaction tube and, from a down part of the reaction tube, preheated wastewater blended with air was continuously introduced for 1,000 hours, the trichloroethylene concentration was measured at an entrance and exit of the reaction tube to calculate the elimination percentage of trichloroethylene.

The reaction conditions were 250° C. at a reaction temperature, 70 kg/cm² G at a reaction pressure, 0.5 liter per hour at the rate of supplying wastewater, and 10N liter per hour at the rate of supplying air. Obtained results are shown in Table 8.

TABLE 8

| kind of catalyst | kind of metal soaked-in (B component) | amount of B component in catalyst (wt %) | elimination percentage of trichloroethylene (%) |
| --- | --- | --- | --- |
| treatment example 23 | preparation example 17 | Ir | 0.3 | 94 |
| treatment example 24 | preparation example 18 | Pt | 0.3 | 96 |
| treatment example 25 | preparation example 19 | Ru | 1.0 | 92 |

Preparation Example 20

A compound consisting of titanium and iron was prepared by the undermentioned process and, as a titanium source, an aqueous sulfuric acid having the following composition was used.

$TiOSO_4$ . . . 250 g/l (as $TiO_2$)

total $H_4SO_4$ . . . 1,100 g/l

Into 100 liter of water were dissolved 5.41 kg of ferric nitrate [$Fe(NO_3)_3 \cdot 9H_2O$] and an obtained solution was well mixed with adding 5 liter of an aqueous sulfuric acid solution of titanyl sulfate (titanium oxysulfate) which has the above composition. To this mixture maintained at about 30° C. with well stirring, an aqueous ammonia was gradually added dropwise until pH 8 being indicated, and an obtained mixture was still stood for 15 hours to make a precipitate (gel).

This gel was taken by filtration, washed with water, and dried at 120° C. for 10 hours. Then, it was calcinated at 700° C. for 5 hours under an air atmosphere. According to a X-ray diffraction analysis, the obtained powder consisted of $TiO_2$ and $Fe_2O_3$, in which the weight ratio between $TiO_2$ and $Fe_2O_3$ was 53.9 versus 46.1 according to a fluorescence X-ray analysis.

Using this obtained powder, a catalyst was prepared by the undermentioned process.

Water, the obtained powder and starch were mixed and well kneaded by a kneader. This kneaded product was molded by a molding device to pellets of paticle diameter 5 mm φ and length 6 mm and calcinated at 500° C. for 3 hours under an air atmosphere.

The pellets thus-obtained were soaked in an aqueous palladium nitrate solution, dried at 120° C. for 6 hours, and calcinated at 400° C. for 3 hours.

An obtained, completed catalyst showed composition having a 98 versus 2 ratio by weight between a $TiO_2$-$Fe_2O_3$ compound and palladium, according to a fluorescence x-ray analysis.

Preparation Example 21

Into 80 liter of water were dissolved 6.57 kg of ferric nitrate [$Fe(NO_3)_3 \cdot 9H_2O$] and 2.17 kg of zirconium oxynitrate (zirconium nitrate) [$ZrO(NO_3)_2 \cdot 2H_2O$] with well mixing. To this mixture maintained at about 30° C. with well stirring, an aqueous ammonia was gradually added dropwise until pH 8 being indicated, and an obtained mixture was still stood for 15 hours to make a precipitate (gel).

This gel was taken by filtration, washed with water, and dried at 120° C. for 10 hours. Then, it was calcinated at 700° C. for 5 hours under an air atmosphere. According to a X-ray diffraction analysis, an obtained powder consisted of $ZrO_2$ and $Fe_2O_3$, in which the weight ratio between $ZrO_2$ and $Fe_2O_3$ was 43.5 versus 56.5 according to a fluorescence X-ray analysis.

Using this obtained powder, a catalyst was prepared by the undermentioned process.

Water, the obtained powder and starch were mixed and well kneaded by a kneader. This kneaded product was molded by a molding device to pellets having a particle diameter 5 mm φ and length 6 mm, and calcinated at 500° C. for 3 hours under an air atmosphere.

The pellets thus-obtained were soaked in an aqueous ruthenium nitrate solution, dried at 120° C. for 6 hours, and calcinated at 400° C. for 3 hours.

An obtained, completed catalyst showed composition having a 95 versus 5 ratio by weight between a $ZrO_2$-$Fe_2O_3$ compound and ruthenium, according to a fluorescence X-ray analysis.

Preparation Example 22

Into 100 liter of water were dissolved 6.07 kg of ferric nitrate [$Fe(NO_3)_3 \cdot 9H_2O$] and an obtained solution was well mixed with dissolving 4 liter of an aqueous sulfuric acid solution of titanyl sulfate (titanium oxysulfate) having the composition used in the preparation example 20 and 1.34 kg of zirconium oxynitrate (zirconium nitrate) [$ZrO(NO_3)_2 \cdot 2H_2O$]. To this mixture maintained at about 30° C. with well stirring, an aqueous ammonia was gradually added dropwise until pH 8 being indicated, and an obtained mixture was still stood for 15 hours to make a precipitate (gel).

This gel was taken by filtration, washed with water, and dried at 120° C. for 10 hours. Then, it was calcinated at 700° C. for 5 hours under an air atmosphere. According to a X-ray diffraction analysis, the obtained powder consisted of $TiO_2$, $ZrO_2$ and $Fe_2O_3$, in which the weight ratios among $TiO_2$, $ZrO_2$ and $Fe_2O_3$ were 35.5, 21.9 and 42.6, respectively, according to a fluorescence X-ray analysis.

Using this obtained powder, a catalyst was prepared by the undermentioned process.

Water, the obtained powder and starch were mixed and well kneaded by a kneader. This kneaded product was molded by a molding device to pellets having a particle diameter 5 mm φ and length 6 mm and calcinated at 500° C. for 3 hours under an air atmosphere.

The pellets thus-obtained were soaked in an aqueous platinum nitrate solution, dried at 120° C. for 6 hours, and calcinated at 400° C. for 3 hours.

An obtained, completed catalyst showed composition having a 99 versus 1 ratio by weight between a $TiO_2$-$ZrO_2$-$Fe_2O_3$ compound and platinum, according to a fluorescence X-ray analysis.

Preparation Examples 23 and 24

The procedure of preparation example 20 was repeated except that the ratio between $TiO_2$ and $Fe_2O_3$ was varied as follows.

$TiO_2$ versus $Fe_2O_3$ (weight ratio)

Preparation example 23 . . . 80 versus 20

Preparation example 24 . . . 15 versus 85

Preparation Examples 25 to 27

Pellets of the $TiO_2$-$ZrO_2$-$Fe_2O_3$ compound obtained from the preparation example 22 were soaked in each of an aqueous chloroauric acid solution, aqueous rhodium nitrate solution and aqueous iridium nitrate solution, dried at 120° C. for 6 hours, and calcinated at 400° C. for 3 hours.

Obtained, completed catalysts had the below-described composition by weight ratios, according to a fluorescence X-ray analysis.

Preparation example 25 . . . ($TiO_2$-$ZrO_2$-$Fe_2O_3$ compound) versus Au=90 versus 10

Preparation example 26 . . . ($TiO_2$-$ZrO_2$-$Fe_2O_3$ compound) versus Rh=99 versus 1

Preparation example 27 . . . ($TiO_2$-$ZrO_2$-$Fe_2O_3$ compound) versus Ir=95 versus 5

Treatment Examples 26 to 33

Using each of the catalysts obtained from the preparation examples 20 to 27, wastewater treatment was carried out by wet oxidation according to the following procedure.

Each of the catalysts (1000 cc) was filled in a reaction tube made of a stainless steel and, from a down part of the reaction tube, preheated wastewater blended with air containing oxygen in a concentration of about 21% was continuously introduced for 5,000 hours, the COD (Cr) concentration and total nitrogen amount were measured at an entrance and exit of the reaction tube to calculate their elimination percentages. Meanwhile, before treatment, wastewater contained 15,000 mg/l of dimethylformamide and showed 20,000 mg/l in the COD (Cr) concentration.

The reaction conditions were 200° C. at a reaction temperature, 40 kg/cm$^2$ G at a reaction pressure, 2 liter per hour at the rate of supplying wastewater, and 230N liter per hour at the rate of supplying air. The obtained results are shown in Table 9.

TABLE 9

| kind of catalyst | | elimination percentage of COD (Cr) (%) | elimination percentage of total nitrogen amount (%) |
|---|---|---|---|
| treatment example 26 | preparation example 20 | 99.9 | 99.5 |
| treatment example 27 | preparation example 21 | 99.9 | 99.1 |
| treatment example 28 | preparation example 22 | 99.9 | 99.0 |
| treatment example 29 | preparation example 23 | 99.9 | 99.4 |
| treatment example 30 | preparation example 24 | 99.9 | 99.6 |
| treatment example 31 | preparation example 25 | 99.6 | 99.0 |
| treatment example 32 | preparation example 26 | 99.7 | 98.5 |
| treatment example 33 | preparation example 27 | 99.5 | 98.3 |

As seen in Table 9, in a continuous operation for 5,000 hours under the forementioned conditions, decrease in the elimination percentages of the COD (Cr) and total nitrogen amount was not recognized.

Treatment Examples 34 to 38

According to the treatment example 26, wastewater treatment was carried out by wet oxidation using each of the catalysts obtained from the preparation examples 20 to 24. Wastewater to be treated contained 20,000 mg/l of glycine and showed 19,000 mg/l in the COD (Cr) concentration.

The reaction conditions were 200° C. at a reaction temperature, 40 kg/cm$^2$ G at a reaction pressure, 2 liter per hour at the rate of supplying wastewater, and 160N liter per hour at the rate of supplying air. The obtained results are shown in Table 10.

TABLE 10

| kind of catalyst | | elimination percentage of COD (Cr) (%) | elimination percentage of total nitrogen amount (%) |
|---|---|---|---|
| treatment example 34 | preparation example 20 | 99.8 | 99.5 |
| treatment example 35 | preparation example 21 | 99.9 | 99.1 |
| treatment example 36 | preparation example 22 | 99.9 | 99.0 |
| treatment example 37 | preparation example 23 | 99.9 | 99.3 |
| treatment example 38 | preparation example 24 | 99.9 | 99.4 |

As seen in Table 10, in a continuous operation for 3,000 hours under the forementioned conditions, decrease in the elimination percentages of the COD (Cr) and total nitrogen amount was not recognized.

Treatment Examples 39 to 43

According to the treatment example 26, wastewater treatment was carried out by wet oxidation using each of the catalysts obtained from the preparation examples 20 to 24. Wastewater to be treated contained 10,000 mg/l of ethanolamine and showed 12,000 mg/l in the COD (Cr) concentration.

The reaction conditions were 200° C. at a reaction temperature, 40 kg/cm$^2$ G at a reaction pressure, 2 liter per hour at the rate of supplying wastewater, and 140N liter per hour at the rate of supplying air. Obtained results are shown in Table 11.

TABLE 11

| kind of catalyst | | elimination percentage of COD (Cr) (%) | elimination percentage of total nitrogen amount (%) |
|---|---|---|---|
| treatment example 39 | preparation example 20 | 99.0 | 99.0 |
| treatment example 40 | preparation example 21 | 98.8 | 98.8 |
| treatment example 41 | preparation example 22 | 98.8 | 98.9 |
| treatment example 42 | preparation example 23 | 99.0 | 98.6 |
| treatment example 43 | preparation example 24 | 99.0 | 98.8 |

As seen in Table 11, in a continuous operation for 3,000 hours under the forementioned conditions, decrease in the elimination percentages of the COD (Cr) and total nitrogen amount was not recognized.

Comparative Preparation Example 12

The procedure of preparation example 20 was repeated to obtain a catalyst except that an aqueous solution of ferric nitrate was not used. Composition of an obtained, completed catalyst showed a weight ratio of 98 versus 2 between $TiO_2$ and palladium.

Comparative Preparation Example 13

Into 4 liter of an aqueous sulfuric acid solution of titanyl sulfate (titanium oxysulfate) having the composition used in the preparation example 20 was added with mixing 1.44 kg of zirconium oxynitrate [$ZrO(NO_3)_2 \cdot 2H_2O$]. To this mixture maintained at about 30° C. with well stirring, an aqueous ammonia was gradually added dropwise until pH 8 being indicated, and an obtained mixture was still stood for 15 hours to make a precipitate (gel).

This gel was taken by filtration, washed with water, and dried at 120° C. for 10 hours. Then, it was calcinated at 700° C. for 5 hours under an air atmosphere. Composition of an obtained powder showed a weight ratio of 60.2 versus 39.8 between $TiO_2$ and $ZrO_2$.

Using this obtained powder, a catalyst was prepared by the undermentioned process.

Water, the obtained powder and starch were mixed and well kneaded by a kneader. This kneaded product was molded by a molding device to pellets having a particle diameter 5 mm $\phi$ and length 6 mm and calcinated at 500° C. for 3 hours under an air atmosphere.

The pellets thus-obtained were soaked in an aqueous iron nitrate solution, dried at 120° C. for 6 hours, and calcinated at 400° C. for 3 hours.

An obtained, completed catalyst showed composition having a 85 versus 15 ratio by weight between a $TiO_2$-$ZrO_2$ compound and $Fe_2O_3$.

Comparative Treatment Examples 12 and 13

Wastewater treatment by wet oxidation was carried out by the procedure of treatment example 26 except that each of the catalysts obtained from the comparative preparation examples 12 and 13 was used.

Results obtained are shown in Table 12.

TABLE 12

|  | kind of catalyst | initial | | after 500 hours | |
| --- | --- | --- | --- | --- | --- |
|  |  | elimination percentage of COD (Cr) (%) | elimination percentage of total nitrogen amount (%) | elimination percentage of COD (Cr) (%) | elimination percentage of total nitrogen amount (%) |
| comparative treatment example 12 | comparative preparation example 12 | 72.0 | 75.0 | 42.0 | 36.0 |
| comparative treatment example 13 | comparative preparation example 13 | 50.5 | 47.5 | 37.0 | 25.5 |

As seen in Table 12, in the comparative treatment example 12 where a catalyst not containing the component (i) was used as well as in the comparative treatment example 13 where a catalyst containing iron as a B component, the COD (Cr)-elimination and total nitrogen-elimination percentages are both lower than the cases where the catalysts of this invention were used, and furthermore, a large decrease in the COD (Cr)-elimination and total nitrogen-elimination percentages was observed in a continuous operation of 500 hours.

Preparation Example 28

Into 100 liter of water were added 9 liter of an aqueous titanyl sulfate solution (which has the same composition as the solution used in preparation example 20) and 4 liter of an aqueous ferrous sulfate [$FeSO_4$; 500 g/l] solution, and these solutions were well mixed each other. To this mixture maintained at about 30° C. with well stirring, an aqueous ammonia was gradually added dropwise until pH 7 being indicated, and an obtained mixture was still stood for 20 hours to make a precipitate (gel).

This gel was taken by filtration, washed with water, and dried at 120° C. for 12 hours. Then, it was calcinated at 700° C. for 6 hours under an air atmosphere. According to a X-ray diffraction analysis, the obtained powder consisted of $TiO_2$ and $Fe_2O_3$, in which the weight ratio between $TiO_2$ and $Fe_2O_3$ was 75.0 versus 25.0 according to a fluorescence X-ray analysis.

Using this obtained powder, a catalyst was prepared by the undermentioned process.

Water, the obtained powder and starch were mixed and well kneaded by a kneader. This kneaded product was molded by a molding device to a spherical shape of average paticle diameter 5 mm and calcinated at 500° C. for 3 hours under an air atmosphere.

The thus-obtained, spherical molded product was soaked in an aqueous ruthenium nitrate solution, dried at 120° C. for 6 hours, and calcinated at 400° C. for 4 hours.

An obtained, completed catalyst showed composition having a 99.7 versus 0.3 ratio by weight between a $TiO_2$-$Fe_2O_3$ compound and Ru, according to a fluorescence X-ray analysis.

Treatment Example 44

Using the catalyst obtained from preparation example 28, wastewater having the below-mentioned composition was treated.

| pH | 13 |
| --- | --- |
| $Na_2S$ | 8% |
| NaSH | 3% |
| $NaCO_3$ | 3% |
| TOD | 100,000 mg/l |

The catalyst (500 cc) was filled in a reaction tube made of a stainless steel of a wet oxidation column and, from a down part of the reaction tube, preheated wastewater blended with air was continuously introduced for 1,000 hours, the concentrations of sulfide ion ($S^{2-}$), thiosulfate ion and COD (Cr) were measured at an entrance and exit of the reaction tube.

The reaction conditions were 150° C. at a reaction temperature, 9 kg/cm² G at a reaction pressure, 0.5 liter per hour at the rate of Supplying wastewater, and 200N liter per hour at the rate of supplying air [ratio of $O_2$/TOD (amount of oxygen in air/total amount of consumed oxygen) is 1.2].

As a result, treated water was stably obtained, which contained COD (Cr), sulfide ion and thiosulfate ion in concentrations of 3000 mg/l or less, 0.1 mg/l or less and 4500 mg/l or less, respectively.

Comparative Treatment Example 14

The procedure of treatment example 44 was repeated except that any catalyst was not filled in a wet oxidation column and the column was empty.

As a result, treated water contained COD (Cr), sulfide ion and thiosulfate ion in concentrations of 23,000 mg/l, 20 mg/l and 30,000 mg/l, respectively.

Treatment Example 45

Wastewater having the below-mentioned composition was treated by the procedure similar to treatment example 44, except that the catalyst in a wet oxidation column was changed.

| | |
|---|---|
| pH | 13 |
| $Na_2S_2O_3$ | 1.7% |
| NaOH | 1.0% |
| TOD | 8,600 mg/l |

A catalyst used in the present treatment example was the catalyst obtained from preparation example 28. This catalyst (500 cc) was filled in a wet oxidation column. The above-mentioned treatment resulted in that treated water containing 70 mg/l or less of COD (Cr), 100 mg/l or less of thiosulfate ion was stably obtained.

Comparative Treatment Example 15

The procedure of treatment example 45 was repeated except that any catalyst was not filled in a wet oxidation column and the column was empty.

As a result, 4300 mg/l of COD (Cr) and 6,000 mg/l of thiosulfate ion remained in treated water.

Treatment Example 46

Wastewater having the below-mentioned composition was treated by the procedure similar to treatment example 44, except that the catalyst in a wet oxidation column was changed.

| | |
|---|---|
| pH | 13 |
| $Na_2S$ | 2.4% |
| $Na_2S_2O_3$ | 0.9% |
| $Na_2SO_3$ | 0.2% |
| NaOH | 0.5% |
| TOD | 25,000 mg/l |

A catalyst used in the present treatment example was the catalyst obtained from preparation example 28. This catalyst (500 cc) was filled in a wet oxidation column.

The above-mentioned treatment resulted in that treated water containing 230 mg/l or less of COD (Cr), 350 mg/l or less of thiosulfate ion was stably obtained. In addition, both sulfide ion and sulfite ion were 0.01 mg/l or less.

Comparative Treatment Example 16

The procedure of treatment example 46 was repeated except that any catalyst was not filled in a wet oxidation column and the column was empty.

As a result, 7,200 mg/l of COD (Cr), 5 mg/l of sulfide ion and 10,000 mg/l of thiosulfate ion remained in treated water. In addition, sulfite ion was 0.01 mg/l or less.

Preparation Example 29

Into 100 liter of water were added 7 liter of an aqueous titanyl sulfate solution (which has the same composition as the solution used in preparation example 20) and 3.80 kg of ferric nitrate [$Fe(NO_3)_3 \cdot 9H_2O$], and these were well mixed. To this mixture maintained at about 30° C. with well stirring, an aqueous ammonia was gradually added dropwise until pH 7 being indicated, and an obtained mixture was still stood for 16 hours to make a precipitate (gel).

This gel was taken by filtration, washed with water, and dried at 120° C. for 20 hours. Then, it was calcinated at 700° C. for 6 hours under an air atmosphere. According to a X-ray diffraction analysis, the obtained powder consisted of $TiO_2$ and $Fe_2O_3$, in which the weight ratio between $TiO_2$ and $Fe_2O_3$ was 70.0 versus 30.0 according to a fluorescence X-ray analysis.

Using this obtained powder, a catalyst was prepared by the undermentioned process.

Water, the obtained powder and starch were mixed and well kneaded by a kneader. This kneaded product was molded by a molding device to a spherical shape of average paticle diameter 6 mm and calcinated at 500° C. for 4 hours under an air atmosphere.

The thus-obtained, spherical molded product was soaked in an aqueous chloroplatinic acid solution, dried at 120° C. for 6 hours, and calcinated at 400° C. for 6 hours.

An obtained, completed catalyst showed composition having a 99.6 versus 0.4 ratio by weight between a $TiO_2$-$Fe_2O_3$ compound and Pt, according to a fluorescence X-ray analysis.

Treatment Example 47

Using the catalyst obtained from preparation example 29 and according to the below-mentioned procedure, wastewater was treated by a wet oxidation. The catalyst (3,000 cc) was filled in a reaction tube made of a stainless steel and from a down part of the reaction tube, preheated wastewater blended with air was continuously introduced for 500 hours, a COD (Cr) concentration, an amount of thiophene and an amount of sodium dodecyl sulfate were measured at an entrance and exit of the reaction tube to calculate treatment efficiency.

Here, conditions of wastewater provided for treatment were 3.5 g/l in an amount of thiophene, 20 g/l in an amount of sodium dodecyl sulfate, 16.2 g/l in other oil content, 21.7 g/l in TOC, and before treatment, caustic soda had been added to the wastewater until pit 13 being indicated. The reaction conditions were 240° C. at a reaction temperature. 70 kg/cm$^2$ G at a reaction pressure, 0.9 per hour at space velocity of wastewater (empty column standard), 6 m per hour at linear velocity of wastewater. Air was introduced to the reaction tube in such an amount that the ratio of $O_2$/TOD (amount of oxygen in air/total amount of consumed oxygen) is 1.0.

As a result, elimination percentages of thiophene, sodium dodecyl sulfate, and TOC were 97.0%, 89.5%, and 82.0%, respectively. In addition, pH of treated water was 8.

Comparative Treatment Example 17

The procedure of treatment example 47 was repeated except that any catalyst was not filled in a wet oxidation column and the column was empty.

As a result, elimination percentages of thiophene, sodium dodecyl sulfate, and TOC were 42.0%, 37.0%, and 34.5%, respectively. In addition, pH of treated water was 11.

Preparation Example 30

Into 100 liter of water were added 5 liter of an aqueous titanyl sulfate solution (which has the same composition as the solution used in preparation example 20), 10.66 kg of ferric nitrate [Fe(NO$_3$)$_3$·9H$_2$O] and 1.32 kg of cerous nitrate [Ce(NO$_3$)$_3$·6H$_2$O], and these were well mixed. To this mixture maintained at about 30° C. with well stirring, an aqueous ammonia was gradually added dropwise until pH 8 being indicated, and an obtained mixture was still stood for 24 hours to make a precipitate (gel).

This gel was taken by filtration, washed with water, and dried at 120° C. for 16 hours. Then, it was calcinated at 700° C. for 6 hours under an air atmosphere. According to a X-ray diffraction analysis, the obtained powder consisted of TiO$_2$, Fe$_2$O$_3$ and CeO$_2$, in which the weight ratio among TiO$_2$, Fe$_2$O$_3$ and CeO$_2$ was 31.2:52.6:16.2 according to a fluorescence X-ray analysis.

Using this obtained powder, a catalyst was prepared by the undermentioned process.

Water, the obtained powder and starch were mixed and well kneaded by a kneader. This kneaded product was molded by a molding device to a spherical shape of average paticle diameter 5 mm and calcinated at 500° C. for 4 hours under an air atmosphere.

The thus-obtained, spherical molded product was soaked in an aqueous ruthenium nitrate solution, dried at 120° C. for 6 hours, and calcinated at 450° C. for 4 hours.

An obtained, completed catalyst showed composition having a 99.4 versus 0.6 ratio by weight between a TiO$_2$-Fe$_2$O$_3$-CeO$_2$ compound and Ru, according to a fluorescence X-ray analysis.

Treatment Example 48

Using the catalyst obtained from preparation example 30, wastewater containing 100 mg/l of ethyl bromide was treated by the below-mentioned process.

The catalyst (500 cc) was filled in a reaction tube made of titanium of a wet oxidation column and, from a down part of the reaction tube, preheated wastewater blended with air was continuously introduced for 1,000 hours, the concentrations of ethyl bromide and bromide ion were measured at an entrance and exit of the reaction tube.

The reaction conditions were 270° C. at a reaction temperature, 80 kg/cm$^2$ G at a reaction pressure, 0.5 liter per hour at the rate of supplying wastewater, and 10 N liter per hour at the rate of supplying air.

As a result, the elimination percentage of ethyl bromide was 99%, and any organic bromine compound except ethyl bromide was not detected in treated water by GC-ECD method. In addition, the bromide ion concentration in the treated water was 73 mg/l and ethyl bromide was not detected at all in waste gas.

Preparation Example 31

Into 100 liter of water were added 5 liter of an aqueous titanyl sulfate solution (which has the same composition as the solution used in preparation example 20) and 7.56 kg of ferric nitrate [Fe(NO$_3$)$_3$·9H$_2$O], and these were well mixed. To this mixture maintained at about 30° C. with well stirring, an aqueous ammonia was gradually added dropwise until pH 7 being indicated, and an obtained mixture was still stood for 16 hours to make a precipitate (gel).

This gel was taken by filtration, washed with water, and dried at 120° C. for 20 hours. Then, it was calcinated at 700° C. for 6 hours under an air atmosphere. According to a X-ray diffraction analysis, the obtained powder consisted of TiO$_2$ and Fe$_2$O$_3$, in which the weight ratio between TiO$_2$ and Fe$_2$O$_3$ was 45.5 versus 54.5 according to a fluorescence X-ray analysis.

Using this obtained powder, a catalyst was prepared by the undermentioned process.

Water, the obtained powder and starch were mixed and well kneaded by a kneader. This kneaded product was molded by a molding device to honeycomb structure having a penetrating hole-corresponding diameter of 10 mm, a cell wall thickness of 1 mm and an opening ratio of 83%, and then calcinated at 500° C. for 4 hours under an air atmosphere.

The thus-obtained, honeycomb type molded product was soaked in an aqueous palladium nitrate solution, dried at 120° C. for 6 hours, and calcinated at 400° C. for 4 hours.

An obtained, completed catalyst showed composition having a 99.3 versus 0.7 ratio by weight between a TiO$_2$-Fe$_2$O, compound and Pd, according to a fluorescence X-ray analysis.

Treatment Example 49

According to treatment example 48, the catalyst obtained from preparation example 31 was filled in a wet oxidation column, and wastewater containing 50 mg/l of dichlorobenzene was treated. However, in the present treatment example, a temperature at an entrance of a reaction vessel was 230° C. , a reaction pressure was 60 kg/cm$^2$ G, and an air amount was 5 liter per hour. Other conditions were similar to treament example 48.

As a result, the elimination percentage of dichlorobenzene was 89%, and any organic chlorine compound except dichlorobenzene was not detected in treated water. In addition, the chloride ion concentration in the treated water was 21 mg/l and dichlorobenzene was not detected at all in waste gas.

Treatment Example 50

The procedure of treatment example 49 was repeated except that a gas containing oxygen in concentration of 70% was used.

As a result, the elimination percentage of dichlorobenzene was 94%, and any organic chlorine compound except dichlorobenzene was not detected in treated water. In addition, the chloride ion concentration in the treated water was 54 mg/l and dichlorobenzene was not detected at all in waste gas.

Preparation Example 32

The honeycomb type molded product of a titanium-iron n oxide obtained from preparatin example 31 was soaked in an aqueous rhodium nitrate solution, dried at 120° C. for 6 hours, and calcinated at at 400° C. for 3 hours to obtain a catalyst.

Treatment Example 51

The catalyst obtained from preparation example 32 was filled in a wet oxidation column, and wastewater treatment was carried out. In addition, wastewater containing 500 mg/l of trichloroethylene was used as model wastewater. The model wastewater did not contain chloride ion. The reaction was carried out under the conditions of 250° C. and 70 kg/cm² G. Other conditions and flow were similar to treatment example 48. As a result, the elimination percentage of trichloroethylene was 95%.

Comparative Treatment Example 18

According to treatment example 51, wastewater similar to the wastewater used in treatment example 51 was treated under the conditions similar to treatment example 51. However, any catalyst was not filled in a wet oxidation column and the column was empty. As a result, the elimination percentage of trichloroethylene was 32%.

Preparation Example 33

Into 100 liter of water, were added 4 liter of an aqueous titanyl sulfate solution (which has the same composition in the solution used in preparation example 20), and these were well mixed each other. To this mixture maintained at about 30° C. with well stirring, an aqueous ammonia was gradually added dropwise until pH 8 being indicated, and an obtained mixture was still stood for 15 hours to make a precipitate (gel).

This gel was taken by filtration and washed with water.

To the gel, 1.67 kg of a hydroxide of iron ($\alpha$-FeOOH) were added and these were mixed and well kneaded by a kneader and dried at 120° C. for 10 hours. Then, the resulting kneaded mixture was calcinated at 700° C. for 5 hours under an air atmosphere to obtain a powder. According to a X-ray diffraction analysis, the obtained powder consisted of $TiO_2$ and $Fe_2O_3$ in which the weight ratio between $TiO_2$ and $Fe_2O_3$ was 40 versus 60 according to a fluorescence X-ray analysis.

Using this obtained powder, a catalyst was prepared by the undermentioned process.

Water, the obtained powder and starch were mixed and well kneaded by a kneader. This kneaded product was molded by a molding device to pellets of particle diameter 5 mm $\phi$ and length 6 mm and calcinated at 500° C. for 3 hours under an air atmosphere.

The pellets thus-obtained were soaked in an aqueous ruthenium nitrate solution, dried at 120° C. for 6 hours, and calcinated at 400° C. for 3 hours.

An obtained, completed catalyst showed composition having a 98 versus 2 ratio by weight between a $TiO_2$-$Fe_2O_3$ compound and ruthenium, according to a fluorescence X-ray analysis.

Treatment Example 52

Using the catalyst obtained from the preparation example 33, wastewater treatment was carried out by wet oxidation according to the following procedure.

The catalyst (1000 cc) was filled in a reaction tube made of a stainless steel and, from a down part of the reaction tube, preheated wastewater blended with air containing oxygen in concentration of about 21% was continuously introduced for 5,000 hours, the COD (Cr) concentration and total nitrogen amount were measured at an entrance and exit of the reaction tube to calculate their elimination percentages. Meanwhile, before treatment, wastewater contained 15,000 mg/l of dimethylformamide and showed 20,000 mg/l in the COD (Cr) concentration.

The reaction conditions were 200° C. at a reaction temperature, 40 kg/cm² G at a reaction pressure, 2 liter per hour at the rate of supplying wastewater, and 230N liter per hour at the rate of supplying air. The obtained results are shown in Table 13.

According to the treatment example 26, wastewater treatment was carried out by wet oxidation using the catalyst obtained from the preparation example 33. Wastewater to be treated contained 20,000 mg/l of glycine and showed 19,000 mg/l in the COD (Cr) concentration.

The reaction conditions were 200° C. at a reaction temperature, 40 kg/cm² G at a reaction pressure, 2 liter per hour at the rate of supplying wastewater, and 160N liter per hour at the rate of supplying air. The obtained results are shown in Table 13.

Treatment Example 54

According to the treatment example 26, wastewater treatment was carried out by wet oxidation using the catalyst obtained from the preparation example 33. Wastewater to be treated contained 10,000 mg/l of ethanolamine and showed 12,000 mg/l in the COD (Cr) concentration.

The reaction conditions were 200° C. at a reaction temperature, 40 kg/cm² G at a reaction pressure, 2 liter per hour at the rate of supplying wastewater, and 140N liter per hour at the rate of supplying air. Obtained results are shown in Table 13.

TABLE 13

|  | Kind of catalyst | Elimination percentage of COD (Cr) % | Elimination percentage of total nitrogen amount (%) |
|---|---|---|---|
| Treatment example 52 | Preparation example 33 | 99.0 | 98.7 |
| Treatment example 53 | Preparation example 33 | 98.5 | 98.5 |
| Treatment example 54 | Preparation example 33 | 98.0 | 98.5 |

Preparation Example 34

Into 30 liter of water was added 2.4 liter of the same aqueous sulfuric acid solution of titanyl sulfate (titanium oxysulfate) as that for the preparation example 20 with well mixing. To the resulting mixture maintained at about 30° C. with well stirring, aqueous ammonia was gradually added dropwise until pH 8 being indicated, and the resulting mixture was still stood for 15 hours to make a precipitate (gel).

This gel was taken by filtration and washed with water. To the resulting gel was added 2.67 kg of a hydroxide of iron ($\alpha$-FeOOH), and they were mixed and well kneaded by a kneader, dried at 120° C. for 10 hours, and calcined at 700° C. for 5 hours under an air atmosphere to obtain a powder. According to a X-ray diffraction analysis, the obtained powder consisted of $TiO_2$ and $Fe_2O_3$ in which the weight ratio of $TiO_2$:$Fe_2O_3$ was 20:80 according to fluorescence X-ray analysis.

Using this obtained powder, a catalyst was prepared by the undermentioned process.

To the powder were added 0.6 liter of an aqueous ruthenium nitrate solution (Ru content: 50 g/l), 0.15 liter of an aqueous palladium nitrate solution (Pd content: 100 g/l), water and starch, and they were mixed and well kneaded by a kneader. The resulting kneaded product was molded by a molding device to pellets of particle diameter 5 mm φ and length 6 mm and calcined at 400° C. for 3 hours under an air atmosphere.

The resulting completed catalyst showed composition in which the weight ratio of $TiO_2:Fe_2O_3:Ru:Pd$ was 19.7:78.8:1:0.5 according to a fluorescence x-ray analysis.

Preparation Example 35

Into 100 liter of water were added 5 liter of the same aqueous sulfuric acid solution of titanyl sulfate (titanium oxysulfate) as that for the preparation example 20 and 5.41 kg of ferric nitrate $[Fe(NO_3)_3\cdot 9H_2O)]$ with well mixing. To the resulting mixture maintained at about 30° C. with well stirring, aqueous ammonia was gradually added dropwise until pH 8 being indicated, and the resulting mixture was still stood for 15 hours to make a precipitate (gel).

This gel was taken by filtration, washed with water, dried at 120° C. for 10 hours, and calcined at 700° C. for 5 hours under an air atmosphere to obtain a powder. According to a X-ray diffraction analysis, the obtained powder consisted of $TiO_2$ and $Fe_2O_3$; in which the weight ratio of $TiO_2:Fe_2O_3$ was 53.9:46.1 according to a fluorescence X-ray analysis.

Using this obtained powder, a catalyst was prepared by the undermentioned process.

To the powder were added 0.46 liter of an aqueous palladium nitrate solution (Pd content: 100 g/l), water and starch, and they were mixed and well kneaded by a kneader. The resulting kneaded product was molded by a molding device to pellets of particle diameter 5 mm φ and length 6 mm and calcined at 400° C. for 3 hours under an air atmosphere.

The resulting completed catalyst showed composition in which the weight ratio of $TiO_2:Fe_2O_3:Pd$ was 52.9:45.2:1.9 according to fluorescence X-ray analysis.

Treatment Example 55

The procedure of the treatment example 52 was repeated to carry out wastewater treatment by wet oxidation except that the catalyst obtained from the preparation example 34 was used instead of the catalyst obtained from the preparation example 33. Obtained results are shown in Table 14.

Treatment Example 56

The procedure of the treatment example 53 was repeated to carry out wastewater treatment by wet oxidation except that the catalyst obtained from the preparation example 34 was used instead of the catalyst obtained from the preparation example 33. Obtained results are shown in Table 14.

Treatment Example 57

The procedure of the treatment example 54 was repeated to carry out wastewater treatment by wet oxidation except that the catalyst obtained from the preparation example 34 was used instead of the catalyst obtained from the preparation example 33. Obtained results are shown in Table 14.

Treatment Example 58

The procedure of the treatment example 52 was repeated to carry out wastewater treatment by wet oxidation except that the catalyst obtained from the preparation example 35 was used instead of the catalyst obtained from the preparation example 33. Obtained results are shown in Table 14.

Treatment Example 59

The procedure of the treatment example 53 was repeated to carry out wastewater treatment by wet oxidation except that the catalyst obtained from the preparation example 35 was used instead of the catalyst obtained from the preparation example 33. Obtained results are in Table 14.

Treatment Example 60

The procedure of the treatment example 54 was repeated to carry out wastewater treatment by wet oxidation except that the catalyst obtained from the preparation example 35 was used instead of the catalyst obtained form the preparation example 33. Obtained results are shown in Table 14.

TABLE 14

|  | Kind of catalyst | Elimination percentage of COD (Cr) (%) | Elimination percentage of total nitrogen amount (%) |
|---|---|---|---|
| Treatment example 55 | Preparation example 34 | 99.5 | 99.0 |
| Treatment example 56 | Preparation example 34 | 99.2 | 99.0 |
| Treatment example 57 | Preparation example 34 | 98.8 | 98.5 |
| Treatment example 58 | Preparation example 35 | 98.0 | 97.5 |
| Treatment example 59 | Preparation example 35 | 97.6 | 97.2 |
| Treatment example 60 | Preparation example 35 | 97.5 | 96.4 |

Preparation Example 36

A catalyst comprising titanium, palladium and iron was prepared by the undermentioned process and, as a titanium source, an aqueous sulfuric acid solution having the following composition was used.

$TiOSO_4$ 250 g/l (as $TiO_2$)

total $H_2SO_4$ 1,100 g/l

Into 100 liter of water were added 5 liter of the aqueous sulfuric acid solution of titanyl sulfate (titanium oxysulfate) having the above composition, 5.41 kg of ferric nitrate $[(Fe(NO_3)_3\cdot 9H_2O)]$ and 473 cc of an aqueous palladium nitrate solution (Pd content: 100 g/l) with well mixing. To the resulting mixture maintained at about 30° C. with well stirring, aqueous ammonia was gradually added dropwise until pH 8 being indicated, and the resulting mixture was still stood for 15 hours to make a precipitate (gel).

This gel was taken by filtration, washed with water, and dried at 120° C. for 10 hours. Then, it was calcined at 700° C. for 5 hours under an air atmosphere. According to a x-ray diffraction analysis, the resulting powder consisted of $TiO_2$, $Fe_2O_3$ and Pd, in which the weight ratio of $TiO_2:Fe_2O_3:Pd$ was 52.8:45.2:2 according to a fluorescence X-ray analysis.

Using this obtained powder, a catalyst was prepared by the undermentioned process.

Water, the powder, and starch were mixed and well kneaded by a kneader. The resulting kneaded product was molded device to pellets of particle diameter 5 mm φ and length 6 mm and calcined at 500° C. for 3 hours under an air atmosphere.

Preparation Example 37

A catalyst comprising titanium, ruthenium and iron was prepared by the undermentioned process and, as a titanium source, an aqueous sulfuric acid solution having the same composition as that for the preparation example 36 was used.

To 2.23 kg of a hydroxide of iron ($\alpha$-FeOOH) were added 0.75 liter of an aqueous ruthenium nitrate solution (Ru content: 50 g/l) and 1 liter of water, and they were mixed and well kneaded by a kneader. The resulting kneaded product was dried at 120° C. for 10 hours and calcined at 600° C. for 3 hours under an air atmosphere to obtain powder.

On the other hand, into 20 liter of water was added 1.85 liter of the same aqueous sulfuric acid solution of titanyl sulfate (titanium oxysulfate) as that for the preparation example 36 with well mixing. To the resulting mixture maintained at about 30° C. with well stirring, aqueous ammonia was gradually added dropwise until pH 8 being indicated, and the resulting mixture was still stood for 15 hours to make a precipitate (gel).

This gel was taken by filtration and washed with water. To the resulting gel was added the above-obtained powder, and they were well kneaded by a kneader, dried at 120° C. for 10 hours, and calcined at 700° C. for 3 hours under an air atmosphere. According to a X-ray diffraction analysis, the resulting powder consisted of $TiO_2$, $Fe_2O_3$ and Ru, in which the weight ratio of $TiO_2:Fe_2O_3:Ru$ was 18.5:80:1.5 according to a fluorescence X-ray analysis.

Using this obtained powder, a catalyst was prepared by the undermentioned process.

Water, the powder, and starch were mixed and well kneaded by a kneader. The resulting kneaded product was molded by a molding device to pellets of particle diameter 5 mm $\phi$ and length 6 mm and calcined at 500° C. for 3 hours under an air atmosphere.

Treatment Examples 61 and 64

Using each of the catalysts obtained from the preparation examples 36 and 37, wastewater treatment was carried out by wet oxidation according to the following procedure.

Each of the catalysts, 1,000 cc, was filled in a reaction tube made of a stainless steel and, from a down part of the reaction tube, preheated wastewater blended with air containing oxygen in a concentration of about 21% was continuously introduced for 5,000 hours, the COD (Cr) concentration and total nitrogen amount were measured at an entrance and exit of the reaction tube to calculate their elimination percentages. Meanwhile, wastewater to be treated contained 15,000 mg/l of dimethylformamide and showed 20,000 mg/l in the COD (Cr) concentration.

The reaction conditions were 200° C. at a reaction temperature, 40 kg/cm$^2$ G at a reaction pressure, 2 liter per hour at the rate of supplying wastewater, and 230N liter per hour at the rate of supplying air. Obtained results are shown in Table 15.

Treatment Examples 62 and 65

According to the treatment examples 61 and 64, wastewater treatment was carried out by wet oxidation using each of the catalysts obtained form the preparation examples 36 and 37. Wastewater to be treated contained 20,000 mg/of glycine and showed 19,000 mg/l in the COD (Cr) concentration.

The reaction conditions were 200° C. at a reaction temperature, 40 kg/cm$^2$ G at a reaction pressure, 2 liter per hour at the rate of supplying wastewater, and 160N liter per hour at the rate of supplying air. Obtained results are shown in Table 15.

Treatment Examples 63 and 66

According to the treatment examples 61 and 64, wastewater treatment was carried out by wet oxidation using each of the catalysts obtained from the preparation examples 36 and 37. Wastewater to be treated contained 10,000 mg/l. of ethanolamine and showed 12,000 mg/l in the COD (Cr) concentration.

The reaction conditions were 200° C. at a reaction temperature, kg/cm$^2$ G at a reaction pressure, 2 liter per hour at the rate of supplying wastewater, and 140 N liter per hour at the rate of supplying air. Obtained results are shown in Table 15.

TABLE 15

| Treatment example 55 | Kind of catalyst | Elimination percentage of COD (Cr) % | Elimination percentage of total nitrogen amount (%) |
|---|---|---|---|
| 61 | 36 | 97.5 | 97.4 |
| 62 | 36 | 97.0 | 97.4 |
| 63 | 36 | 96.8 | 96.9 |
| 64 | 37 | 97.0 | 96.9 |
| 65 | 37 | 96.5 | 95.8 |
| 66 | 37 | 96.2 | 95.1 |

It is claimed:

1. A process for treating wastewater, comprising wet oxidation treatment of the wastewater by using a solid catalyst under conditions that the wastewater is at a temperature of 100° to 370° C. and an oxygen gas is supplied at a pressure maintaining the wastewater in a liquid phase;

wherein a catalyst used as said solid catalyst comprises the following components of $A_1$, $A_2$ and either one or both of $B_1$ and $B_2$ wherein:

the $A_1$ component consists of 30–95.00% by weight of an oxide of iron, the $A_2$ component consists of 4.95–69.95% by weight of at least one compound selected from the group consisting of titania, silica, zirconia and complex oxides of titania, silica and/or zirconia with each other, the $B_1$ component consists of 0.05–50% by weight of a metal or compound of at least one element selected from the group consisting of cobalt, nickel, cerium and silver, and the $B_2$ component consists of 0.05–10% by weight of a metal or compound of at least one element selected from the group consisting of gold, platinum, palladium, rhodium, ruthenium and iridium.

2. A process for treating wastewater according to claim 1, wherein the wastewater includes a nitrogen-containing compound.

3. A process for treating wastewater according to claim 1, wherein the wastewater includes a sulfur-containing compound.

4. A process for treating wastewater according to claim 1, wherein the wastewater includes an organic halogen compound.

5. A process for treating wastewater according to claim 1, wherein:

in a case where the catalyst contains the $B_1$, component, the ratio by weight of $B_1$ to $A_1$ is in a range of from 0.0005 to 0.4, in a case where the catalyst contains the $B_2$ component, the ratio by weight of $B_2$ to $A_1$ is in a range of from 0.01 to 1.

6. A process for treating wastewater according to claim 5, wherein the wastewater includes a nitrogen-containing compound.

7. A process for treating wastewater according to claim 5, wherein the wastewater includes a sulfur-containing compound.

8. A process for treating wastewater according to claim 5, wherein the wastewater includes an organic halogen compound.

9. A process for treating wastewater according to claim 1, wherein the catalyst comprises the component $A_1$, $A_2$ and $B_2$.

10. A process for treating wastewater according to claim 9, wherein the ratio by weight of $B_2$ to $A_1$ is in a range of from 0.01 to 1.

11. A process for treating wastewater according to claim 9 wherein the $A_1$ component consists of 45–95.00% by weight of an oxide of iron.

12. A process for treating wastewater according to claim 9, wherein the $A_1$ component consists of 50–95.00% by weight of an oxide of iron.

13. A process for treating wastewater according to claim 9, wherein said catalyst further comprises the $B_1$ component consisting of 0.05–50% by weight of a metal or compound of at least one element selected from the group consisting of cobalt, nickel, cerium and silver.

14. A process for treating wastewater according to claim 13, wherein the ratio by weight of $B_1$ to $A_1$ is in a range of from 0.0005 to 0.4.

15. A process for treating wastewater according to claim 14, wherein the ratio by weight of $B_2$ to $A_1$ is in a range of from 0.01 to 1.

16. A process for treating wastewater according to claim 13, wherein the $A_1$ component consists of 45–95.00% by weight of an oxide of iron.

17. A process for treating wastewater according to claim 13, wherein $A_1$ component consists of 50–95.00% by weight of an oxide of iron.

18. A process for treating wastewater according to claim 1 wherein the $A_1$ component consists of 45–95.00% by weight of an oxide of iron.

19. A process for treating wastewater according to claim 1, wherein the $A_1$ component consists of 50–95.00% by weight of an oxide of iron.

20. A process for treating wastewater according to claim 1, wherein the catalyst comprises the components of $A_1$, $A_2$ and either one or both of $B_1$ and $B_2$ in the absence of $Al_2O_3$-$SiO_2$.

21. A process for treating wastewater, comprising wet oxidation treatment of the wastewater by using a solid catalyst under conditions that the wastewater is at a temperature of 100° to 370° C. and an oxygen gas is supplied at a pressure maintaining the wastewater in a liquid phase;

wherein a catalyst used as said solid catalyst comprises the following components of $A_1$, $A_2$ and either one or both of $B_1$ and $B_2$ wherein:

the $A_1$ component consists of 30–95.00% by weight of an oxide of iron, the $A_2$ component consists of 4.95–69.95% by weight of an oxide of at least one element selected from the group consisting of titanium and zirconium, the $B_1$ component consists of 0.05–50% by weight of a metal or compound of at least one element selected from the group consisting of cobalt, nickel, cerium and silver, and the $B_2$ component consists of 0.05–10% by weight of a metal or compound of at least one element selected from the group consisting of gold, platinum, palladium, rhodium, ruthenium and iridium.

22. A process for treating wastewater according to claim 21, wherein the wastewater includes a nitrogen-containing compound.

23. A process for treating wastewater according to claim 21, wherein the wastewater includes a sulfur-containing compound.

24. A process for treating wastewater according to claim 21, wherein the wastewater includes an organic halogen compound.

25. A process for treating wastewater according to claim 21, wherein:

in a case where the catalyst contains the $B_1$ component, the ratio by weight of $B_1$ to $A_1$ is in the range of from 0.0005 to 0.4, in a case where the catalyst contains the $B_2$ component, the ratio by weight of $B_2$ to $A_1$ is in the range of from 0.01 to 0.1.

26. A process for treating wastewater according to claim 25, wherein the wastewater includes a nitrogen-containing compound.

27. A process for treating wastewater according to claim 25, wherein the wastewater includes a sulfur-containing compound.

28. A process for treating wastewater according to claim 25, wherein the wastewater includes an organic halogen compound.

29. A process for treating wastewater according to claim 21, wherein the catalyst comprises the components $A_1$, $A_2$ and $B_2$.

30. A process for treating wastewater according to claim 29, wherein the ratio by weight of $B_2$ to $A_1$ is in a range of from 0.01 to 1.

31. A process for treating wastewater according to claim 29 wherein the $A_1$ component consists of 45–95.00% by weight of an oxide of iron.

32. A process for treating wastewater according to claim 29, wherein the $A_1$ component consists of 50–95.00% by weight of an oxide of iron.

33. A process for treating wastewater according to claim 29, wherein said catalyst further comprises the $B_1$ component consisting of 0.05–50% by weight of a metal or compound of at least one element selected from the group consisting of cobalt, nickel, cerium and silver.

34. A process for treating wastewater according to claim 33, wherein the ratio by weight of $B_1$ to $A_1$ is in a range of from 0.0005 to 0.4.

35. A process for treating wastewater according to claim 34, wherein the ratio by weight of $B_2$ to $A_1$ is in a range of from 0.01 to 1.

36. A process for treating wastewater according to claim 33, wherein the $A_1$ component consists of 45–95.00% by weight of an oxide of iron.

37. A process for treating wastewater according to claim 33, wherein $A_1$ component consists of 50–95.00% by weight of an oxide of iron.

38. A process for treating wastewater according to claim 21 wherein the $A_1$ component consists of 45–95.00% by weight of an oxide of iron.

39. A process for treating wastewater according to claim 21, wherein the $A_1$ component consists of 50–95.00% by weight of an oxide of iron.

40. A process for treating wastewater according to claim 21, wherein the catalyst comprises the components of $A_1$, $A_2$ and either one or both of $B_1$ and $B_2$ in the absence of $Al_2O_3$-$SiO_2$.

* * * * *

UNITED STATES PATENT AND TRADEMARK OFFICE
CERTIFICATE OF CORRECTION

PATENT NO.:   5,620,610
DATED     :   April 15, 1997
INVENTOR(S):  ISHII et al.

It is certified that error appears in the above-identified patent and that said Letters Patent is hereby corrected as shown below:

On the cover page, after Item [22], the following should appear:

-- [30]           Foreign Application Priority Data

May 14, 1991    [JP]  Japan....................3-109433/1991
   Sept. 20, 1991  [JP]  Japan....................3-241973/1991
   Oct. 24, 1991   [JP]  Japan. ..................3-277796/1991
   Feb. 5, 1992    [JP]  Japan....................4-019880/1992--.

Signed and Sealed this

Seventh Day of April, 1998

Attest:

BRUCE LEHMAN

*Attesting Officer*    Commissioner of Patents and Trademarks